US010736322B2

(12) United States Patent
MacInnes

(10) Patent No.: US 10,736,322 B2
(45) Date of Patent: *Aug. 11, 2020

(54) AQUEOUS CONCENTRATED HERBICIDAL COMPOSITIONS CONTAINING GLYPHOSATE SALTS AND DICAMBA SALTS

(71) Applicant: Monsanto Technology LLC, St. Louis, MO (US)

(72) Inventor: Alison MacInnes, St. Louis, MO (US)

(73) Assignee: Monsanto Technology LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/405,036

(22) PCT Filed: Jun. 4, 2013

(86) PCT No.: PCT/US2013/043995
§ 371 (c)(1),
(2) Date: Dec. 2, 2014

(87) PCT Pub. No.: WO2013/184622
PCT Pub. Date: Dec. 12, 2013

(65) Prior Publication Data
US 2015/0164082 A1 Jun. 18, 2015

Related U.S. Application Data

(60) Provisional application No. 61/655,018, filed on Jun. 4, 2012.

(51) Int. Cl.
*A01N 57/20* (2006.01)
*A01N 37/40* (2006.01)
*A01N 37/10* (2006.01)

(52) U.S. Cl.
CPC ............. *A01N 57/20* (2013.01); *A01N 37/10* (2013.01); *A01N 37/40* (2013.01)

(58) Field of Classification Search
CPC ......... A01N 57/20; A01N 37/10; A01N 37/40
See application file for complete search history.

(56) References Cited

U.S. PATENT DOCUMENTS

| 2,505,059 | A | 4/1950 | Moore |
| 3,013,054 | A | 12/1961 | Richter |
| 3,276,856 | A | 10/1966 | Esposito |
| 3,594,151 | A | 7/1971 | Sprayberry et al. |
| 3,600,407 | A | 8/1971 | Levin et al. |
| 3,713,404 | A | 1/1973 | Lavo et al. |
| 3,751,239 | A | 8/1973 | McNulty et al. |
| 3,799,758 | A | 3/1974 | Franz |
| 3,852,340 | A | 12/1974 | Reck et al. |
| 3,870,732 | A | 3/1975 | Hokama |
| 3,910,974 | A | 10/1975 | Hokama |
| 3,923,849 | A | 12/1975 | Hokama |
| 4,022,610 | A | 5/1977 | Hokama |
| 4,405,531 | A | 9/1983 | Franz |
| 4,445,927 | A | 5/1984 | Gimesi et al. |
| 4,534,783 | A | 8/1985 | Beestman |
| 4,546,196 | A | 10/1985 | Luteri et al. |
| H0000303 | H | 7/1987 | Malik et al. |
| 4,692,184 | A | 9/1987 | Lee |
| 4,729,781 | A | 3/1988 | Williams |
| 4,936,900 | A | 6/1990 | Hyson |
| 4,936,901 | A | 6/1990 | Surgant, Sr. et al. |
| 5,004,863 | A | 4/1991 | Umbeck |
| 5,015,580 | A | 5/1991 | Christou et al. |
| 5,035,738 | A | 7/1991 | Burns et al. |
| 5,152,823 | A | 10/1992 | Albrecht et al. |
| 5,159,135 | A | 10/1992 | Umbeck |
| 5,175,353 | A | 12/1992 | Jones et al. |
| 5,221,319 | A | 6/1993 | Van Haften et al. |
| 5,221,791 | A | 6/1993 | Narayanan et al. |
| 5,229,354 | A | 7/1993 | Narayanan et al. |
| 5,229,355 | A | 7/1993 | Chaudhuri et al. |
| 5,231,070 | A | 7/1993 | Narayanan et al. |

(Continued)

FOREIGN PATENT DOCUMENTS

AU 10073/92 B 10/1992
AU 2005221166 B2 9/2005
(Continued)

OTHER PUBLICATIONS

Wicks, Gail A. et al., "Influence of Small Grain Crops on Weeds and Ecofallow Corn (*Zea mays*)", Weed Science, 1995, pp. 128-133, vol. 43, Issue 1.
Wicks, Gail A. et al., "Survey of Winter Wheat (*Triticum aestivum*) Stubble Fields Sprayed with Herbicides After Harvest in 1986", Weed Technology, 1989, pp. 244-254, vol. 3, Issue 2.
Wiese, Allen F. et al., "Downy Brome (*Bromus tectorum*), Jointed Goatgrass (*Aegilops cylindrica*) and Horseweed (*Conyza canadensis*) Control in Fallow", Weed Technology, 1995, pp. 249-254, vol. 9, Issue 2.
Wiese, Allen F. et al., "Economic evaluation of field bindweed (*Convolvulus arvensis*) control", Weed Science, 1997, pp. 288-295, vol. 45.
Wiese, Allen F. et al., "Economic Evaluation of Field Bindweed (*Convolvulus arvensis*) Control in a Winter Wheat-Fallow Rotation", Weed Science, 1996, pp. 622-628, vol. 44, Issue 3.
Wilson, John S. et al., "Combinations of Nonselective Herbicides for Difficult to Control Weeds in No-Till Corn, *Zea mays*, and Soybeans, *Glycine max*", Weed Science, 1988, pp. 648-652, vol. 36, Issue 5.

(Continued)

*Primary Examiner* — Mina Haghighatian
*Assistant Examiner* — Nathan W Schlientz
(74) *Attorney, Agent, or Firm* — Stinson LLP; Erin C. Robert

(57) ABSTRACT

Herbicidal concentrate compositions containing a combination of glyphosate salt and dicamba salt are provided. For example, a low volatility aqueous herbicidal concentrate composition including a glyphosate salt, dicamba salt, and a surfactant is described, wherein (i) the composition contain a total active herbicide loading of glyphosate salt and dicamba salt of at least about 450 grams acid equivalent per liter; (ii) the pH of the concentrate composition is less than about 5.7; and (iii) the acid equivalent weight ratio of glyphosate salt to dicamba salt is from about 1:1 to about 3:1.

19 Claims, No Drawings

(56) References Cited

U.S. PATENT DOCUMENTS

| | | | |
|---|---|---|---|
| 5,250,500 A | 10/1993 | Jones et al. |
| 5,266,553 A | 11/1993 | Champion et al. |
| 5,283,228 A | 2/1994 | Narayanan et al. |
| 5,317,003 A | 5/1994 | Kassebaum et al. |
| 5,384,253 A | 1/1995 | Krzyzek et al. |
| 5,416,011 A | 5/1995 | Hinchee et al. |
| 5,434,783 A | 7/1995 | Pal et al. |
| 5,436,223 A | 7/1995 | Mulqueen et al. |
| 5,463,174 A | 10/1995 | Moloney et al. |
| 5,508,184 A | 4/1996 | Negrutiu et al. |
| 5,518,908 A | 5/1996 | Corbin et al. |
| 5,538,880 A | 6/1996 | Lundquist et al. |
| 5,550,318 A | 8/1996 | Adams et al. |
| 5,565,409 A | 10/1996 | Sato et al. |
| 5,569,834 A | 10/1996 | Hinchee et al. |
| 5,591,616 A | 1/1997 | Hiei et al. |
| 5,631,152 A | 5/1997 | Fry et al. |
| 5,668,085 A | 9/1997 | Forbes et al. |
| 5,670,454 A | 9/1997 | Grossmann et al. |
| 5,703,015 A | 12/1997 | Berger et al. |
| 5,733,848 A | 3/1998 | Luteri |
| 5,750,468 A | 5/1998 | Wright et al. |
| 5,824,877 A | 10/1998 | Hinchee et al. |
| 5,834,006 A | 11/1998 | Smith et al. |
| 5,877,112 A * | 3/1999 | Roberts ............... A01N 25/02 |
| | | 504/206 |
| 5,883,046 A | 3/1999 | Luteri |
| 5,883,048 A | 3/1999 | Morre et al. |
| 5,965,487 A | 10/1999 | Flahive |
| 5,981,840 A | 11/1999 | Zhao et al. |
| 5,998,332 A | 12/1999 | Sato et al. |
| 6,030,923 A | 2/2000 | Okano et al. |
| 6,060,432 A | 5/2000 | Adams et al. |
| 6,063,733 A | 5/2000 | Berger et al. |
| 6,107,249 A | 8/2000 | Wikeley |
| 6,121,199 A | 9/2000 | Berger et al. |
| 6,133,199 A | 10/2000 | Soula et al. |
| 6,160,208 A | 12/2000 | Lundquist et al. |
| 6,177,414 B1 | 1/2001 | Tomalia et al. |
| 6,228,807 B1 | 5/2001 | Kuchikata et al. |
| 6,245,713 B1 | 6/2001 | Brinker et al. |
| 6,277,788 B1 | 8/2001 | Wright |
| 6,300,323 B1 | 10/2001 | Haga et al. |
| 6,337,078 B1 | 1/2002 | Levy et al. |
| 6,384,301 B1 | 5/2002 | Martinelli et al. |
| 6,399,861 B1 | 6/2002 | Anderson et al. |
| 6,403,865 B1 | 6/2002 | Koziel et al. |
| 6,410,783 B1 | 6/2002 | Peterson et al. |
| 6,417,140 B1 | 7/2002 | Patel |
| 6,436,874 B1 | 8/2002 | Kuah et al. |
| 6,455,473 B2 | 9/2002 | Wright |
| RE37,866 E | 10/2002 | Wright et al. |
| 6,500,783 B1 | 12/2002 | Bryson et al. |
| 6,569,809 B1 | 5/2003 | Sato et al. |
| 6,579,831 B1 | 6/2003 | Harwell |
| 6,586,367 B2 | 7/2003 | Lee et al. |
| 6,677,276 B1 | 1/2004 | Hacker et al. |
| 6,713,433 B2 | 3/2004 | Jimoh |
| 6,723,681 B2 | 4/2004 | Hacker et al. |
| 6,774,085 B1 | 8/2004 | Hacker et al. |
| 6,774,087 B1 | 8/2004 | Nakayama et al. |
| 6,906,004 B2 | 6/2005 | Parrish et al. |
| 6,939,555 B2 | 9/2005 | Volgas et al. |
| 7,012,040 B2 | 3/2006 | Hacker et al. |
| 7,105,470 B1 | 9/2006 | Hacker et al. |
| 7,135,437 B2 | 11/2006 | Pallas et al. |
| 7,223,718 B2 | 5/2007 | Smiley |
| 7,422,998 B2 | 9/2008 | Hacker et al. |
| 7,431,845 B2 | 10/2008 | Manek et al. |
| 7,695,541 B1 | 4/2010 | Frizzell et al. |
| 2001/0019997 A1 | 9/2001 | Wright |
| 2002/0094934 A1 | 7/2002 | Hacker et al. |
| 2002/0107149 A1 | 8/2002 | Volgas et al. |
| 2002/0123430 A1 | 9/2002 | Ku et al. |
| 2002/0155953 A1 | 10/2002 | Brignance |
| 2003/0004063 A1 | 1/2003 | Jimoh |
| 2003/0022791 A1 | 1/2003 | Asrar et al. |
| 2003/0060370 A1 | 3/2003 | Jones |
| 2003/0104943 A1 | 6/2003 | Lennon et al. |
| 2004/0077499 A1 | 4/2004 | Graham et al. |
| 2004/0138176 A1 | 7/2004 | Miles |
| 2005/0026780 A1 | 2/2005 | Parrish |
| 2005/0261130 A1 | 11/2005 | Lennon et al. |
| 2006/0019828 A1 | 1/2006 | Becher et al. |
| 2006/0040828 A1 | 2/2006 | Mao et al. |
| 2006/0270556 A1 | 11/2006 | Wright et al. |
| 2007/0093462 A1 | 4/2007 | Rogers et al. |
| 2007/0149409 A1 | 6/2007 | Burnet et al. |
| 2007/0184980 A1 | 8/2007 | Roberts et al. |
| 2007/0259789 A1 | 11/2007 | Huchet et al. |
| 2008/0119361 A1 | 5/2008 | Feng et al. |
| 2008/0153706 A1 | 6/2008 | Frisch et al. |
| 2008/0182773 A1 | 7/2008 | Gauweiler et al. |
| 2008/0207452 A1 | 8/2008 | Kramer et al. |
| 2008/0207453 A1 | 8/2008 | Kramer et al. |
| 2009/0041813 A1 | 2/2009 | Bouillo et al. |
| 2009/0062127 A1 | 3/2009 | Liu |
| 2009/0093366 A1 | 4/2009 | Wright et al. |
| 2009/0170702 A1 | 7/2009 | Yoshii et al. |
| 2010/0234230 A1 | 9/2010 | Fowler |
| 2010/0273654 A1 | 10/2010 | Li et al. |
| 2010/0331182 A1 | 12/2010 | Zhang et al. |
| 2011/0034332 A1 | 2/2011 | Becher et al. |
| 2011/0263430 A1 * | 10/2011 | Seifert-Higgins ..... A01N 25/30 |
| | | 504/206 |
| 2011/0275517 A1 | 11/2011 | Satchivi et al. |
| 2012/0053056 A1 | 3/2012 | Liu et al. |
| 2012/0115816 A1 | 5/2012 | Ramsay et al. |
| 2012/0184434 A1 | 7/2012 | Xu et al. |
| 2014/0171321 A1 | 6/2014 | Wright et al. |
| 2014/0249026 A1 | 9/2014 | Hemminghaus et al. |
| 2014/0309114 A1 | 10/2014 | Zhang et al. |

FOREIGN PATENT DOCUMENTS

| | | |
|---|---|---|
| AU | 2010202620 A1 | 7/2010 |
| CA | 1293974 C | 1/1992 |
| CA | 2340240 A1 | 2/2000 |
| CA | 2729738 A1 | 1/2010 |
| CN | 1513326 A | 7/2004 |
| DE | 4030687 A1 | 5/1995 |
| DE | 19836660 | 2/2000 |
| DE | 19836684 | 2/2000 |
| DE | 19836700 | 2/2000 |
| DE | 19836737 | 2/2000 |
| EP | 0183384 A1 | 6/1986 |
| EP | 0375624 A1 | 6/1990 |
| EP | 0290416 | 6/1993 |
| EP | 0360441 | 4/1994 |
| EP | 0808569 A1 | 11/1998 |
| EP | 1023832 A1 | 8/2000 |
| EP | 1095564 B1 | 5/2001 |
| EP | 2308309 A1 | 4/2011 |
| GB | 851008 A | 10/1960 |
| GB | 1262123 A | 2/1972 |
| GB | 2267825 A | 12/1993 |
| RU | 2208930 C1 | 7/2003 |
| RU | 2366176 C2 | 9/2009 |
| RU | 2384064 C1 | 3/2010 |
| RU | 2395203 C1 | 7/2010 |
| RU | 2408188 C1 | 1/2011 |
| SU | 1665561 C2 | 10/1995 |
| WO | 9212637 A1 | 9/1992 |
| WO | 95/16351 | 6/1995 |
| WO | 97/24931 A1 | 7/1997 |
| WO | 97/31535 | 9/1997 |
| WO | 9900013 A2 | 1/1999 |
| WO | 9905914 A1 | 2/1999 |
| WO | 00/08936 | 2/2000 |
| WO | 0005951 A1 | 2/2000 |
| WO | 0005952 A1 | 2/2000 |
| WO | 00/15037 | 3/2000 |
| WO | 00/30451 A1 | 6/2000 |
| WO | 2000030452 A1 | 6/2000 |

(56) References Cited

FOREIGN PATENT DOCUMENTS

| | | |
|---|---|---|
| WO | 00/67571 | 11/2000 |
| WO | 0064257 A1 | 11/2000 |
| WO | 2001/17358 | 3/2001 |
| WO | 0135740 A2 | 5/2001 |
| WO | 2001/89302 | 11/2001 |
| WO | 0221924 A2 | 3/2002 |
| WO | 02/096199 | 12/2002 |
| WO | 2002102153 A2 | 12/2002 |
| WO | 03/013241 | 2/2003 |
| WO | 2003024218 A1 | 3/2003 |
| WO | 2004093546 A1 | 11/2004 |
| WO | 2005/087007 A1 | 9/2005 |
| WO | 2005115144 A1 | 12/2005 |
| WO | 2007110355 A2 | 10/2006 |
| WO | 2008030749 A2 | 3/2008 |
| WO | 2008101818 A2 | 8/2008 |
| WO | 2009060026 A2 | 5/2009 |
| WO | 2010046422 A2 | 4/2010 |
| WO | 2010071936 A1 | 7/2010 |
| WO | 2010102102 A1 | 9/2010 |
| WO | 2010/151622 A2 | 12/2010 |
| WO | 2010147966 A1 | 12/2010 |
| WO | 2011/019652 A2 | 2/2011 |
| WO | 2011026800 A1 | 3/2011 |
| WO | 2011039172 A2 | 4/2011 |
| WO | 2011082162 A1 | 7/2011 |
| WO | 2012/027349 A1 | 3/2012 |
| WO | 2012040785 A1 | 4/2012 |
| WO | 2012104237 A2 | 8/2012 |
| WO | 2012163824 A1 | 12/2012 |
| WO | 2013063357 A3 | 2/2013 |
| WO | 2014134235 A1 | 9/2014 |

OTHER PUBLICATIONS

Woznica, Zenon, "Effect of Water Quality and Adjuvants on Phytotoxicity of Glyphosate", Roczniki nauk rolniczych. Seria E: *Ochrona roslin*, 1992, pp. 97-101, vol. 22.
Wyrill, J.B., et al., "Glyphosate Toxicity to Common Milkweed and Hemp Dogbane as Influenced by Surfactants," 1977, Weed Science, 25/3:275-287.
Yarborough, David E. et al., "Barrenberry aronia melanocarpa (Michx.) Eli, Control in Native Lowbush Blueberry Vaccinium angustifolium Ait. Fields through Selective Applications of 2,4-D (2,4-Dichlorophenoxyacetic Acid) and Glyphosate [N-(Phosphonomethyl) Glycene]," HortScience, 1978, pp. 353-354, vol. 13, Issue 3, Section 2, American Society for Horticultural Science.
Label Revisions, Tordon 22K Weed Killer (Dow AgroSciences LLC), EPA Reg. No. 62719-6, Dec. 30, 1998, 31 pages.
Label Revisions, Fallow Master Herbicide (Monsanto Company), EPA Reg. No. 524-390, Jul. 14, 1997, 16 pages.
Label Amendment, Banvel Herbicide (BASF Corporation), EPA Reg. No. 55947-38, May 17, 1994, 56 pages.
EPA Notice of Pesticide Registration, MON 78270 Herbicide (Monsanto Company), EPA Reg. No. 524-437, Apr. 11, 2002, 120 pages.
EPA Notice of Pesticide Registration, Roundup VM Herbicide (Monsanto Company), EPA Reg. No. 424-544, Oct. 10, 2002, 123 pages.
Notification of Alternate Brand Name, RT Master II Herbicide (Monsanto Company), EPA Reg. No. 524-539, Jul. 9, 2003, 32 pages.
Supplemental Product Label, Roundup WeatherMAX Herbice (Monsanto Company), EPA Reg. No. 524-537, Accepted Feb. 6, 2003, 2 pages.
Supplemental Product Label, Roundup Original Max Herbicide (Monsanto Company), EPA Reg. No. 524-539, Accepted Oct. 30, 2003, 6 pages.
Draft Product Label, Roundup PowerMax Herbicide (Monsanto Company), Label No. 55687/1201, N.R.A. Approved Text Oct. 10, 2003, 13 pages.
Product Label, Amicide Selective Herbicide (Nufarm Australia Limited), NRA Approval No. 52904/0800, 15 pages.
Product Label, Buttress Selective Herbicide (Nufarm Limited), NRA Approval No. 46043/02, Dec. 1997, 8 pages.
Product Label, Conqueror Herbicide (Nufarm Australia Limited), NRA Approval No. 57783/0703, 6 pages.
Product Label, Lantana DP-600 Herbicide (Nurfarm Australia Limited), NRA Approval No. 41494/0299, 1 page.
Product Label, Kamba 500 Selective Herbicide (Nufarm Australia Limited), NRA File No. 51080/0902, 6 pages.
Product Label, L.V.E. MCPA Low-Volatile Ester Herbicide (Nufarm Australia Limited), NRA Approval No. 31521/0603, 2 pages.
Product Label, LV Estercide 600 Herbicide (Nufarm Australia Limited), NRA File No. 42229/0902, 5 pages.
Product Label, Paramount Herbicide (BASF Corporation), EPA Ref. No. 7969-113, Jul. 30, 2003, 8 pages.
Product Label, Starmas Herbicide (Mastra Industries SDN BHD), Oct. 15, 2003, 9 pages.
Product Label, Surpass 300 (Nufarm Australia Limited), NRA Approval No. 52999/0902, 7 pages.
Material Safety Data Sheet regarding Amine 4 2,4-D Weed Killer prepared by Registrations and Regulatory Affairs, Date of Issue Dec. 14, 2012, 3 pages.
Banvel Herbicide Product Label, EPA Ref. No. 66330-276, not dated, Arysta LifeScience North America, LLC, 29 pages.
Clarity®, Safety Data Sheet, (Version 3.0) BASF the Chemical Company May 2, 2013, 9 pages.
Fallow Master Herbicide Label, EPA Reg. No. 524-507, copyright 2000, 5 pages.
Fallow Master (Monsanto Company) Material Safety Data Sheet, EPA Reg. No. 524-506, Effective Jan. 31, 2003, 11 pages.
Sarpe et al., "Development of Various Strategies to Control Both Annual and Perennial Weed Species in Apple Orchards on Sandy Soils," Brighton Crop Protection Conference—Weeds 1995, 3, 947-952.
O'Donovan, et al., The Antagonistic Action of 2,4-D and Bromoxynil on Glyphosate Phytotoxicity, Weed Science, 1982, 30, 30-34.
Product Label, Touchdown Hi Tech Herbicide (Syngenta Crop Protection), NRA Approval No. 54617/0502, 2002, 12 pages.
Product Label, Tillmaster Herbicide (Nufarm Australia Limited), NRA Approval No. 32162/1097, undated, 1 page.
Herbicide Formulations, Purdue University (http://web.archive.org/web/*/http://www.agriculture.purdue.edu/fnr/html/faculty/holt/NRCASupplement.pdf), 2007, 19 pages.
Serafini, dicamba, diglycolamine salt (Clarity) Active Ingredient Registration 6/00 (http://pmep.cce.cornell.edu/profiles/herb-growthreg/dalapon-ethephon/diglycolamine/Diglycolamine_600.html), dated Jun. 9, 2000, 3 pages.
Written Opinion dated Oct. 24, 2013 in International PCT Application No. PCT/US2013/43995, 5 pages.
International Search Report dated Oct. 24, 2013 in International PCT Application No. PCT/US2013/43995, 3 pages.
Abdul Salam, M. et al., "Efficacy of Chemical Weed Control in Cashew Plantations", Journal of Plantation Crops, Jun. 1993, pp. 54-56, vol. 21, Issue 1.
Al-Khatib, Kassim et al., "Sweet Cherry (*Prunus avium*) Response to Simulated Drift from Selected Herbicides", Weed Technology, 1992, pp. 975-979, vol. 6, Issue 4.
Alm, David M. et al., "Weed Suppression for Weed Management in Corn (*Zea mays*) and Soybean (*Glycine max*) Production Systems", Weed Technology, 2000, pp. 713-717, vol. 14, Issue 4.
Beck, K. George et al., "Jointed Goatgrass (*Aegilops cylindrica*) and Downy Brome (*Bromus tectorum*) Control in Perennial Grasses", Weed Technology, 1995, pp. 255-259, vol. 9, Issue 2.
Blackshaw, Robert E., "Control of Downy Brome (*Bromus tectorum*) in Conservation Fallow Systems", Weed Technology, 1991, pp. 557-562, vol. 5, Issue 3.
Combellack, Joseph H., et al., "The Influence of Adjuvants on the Performance of a Glyphosate/2,4-D Mixture", Adjuvants for Agrichemicals, 1992, pp. 303-310, Chapter 29.
Cramer, Gary L. et al., "Control of Common Milkweed (*Asclepias syriaca*)", Weed Science, 1981, pp. 636-640, vol. 29, Issue 6.

(56) References Cited

OTHER PUBLICATIONS

Culpepper, A.S., et al., "Morningglory (*Ipomoea* spp.) and Large Crabgrass (*Gigitaria sanguinalis*) Control with Glyphosate and 2,4-DB Mixtures in Glyphosate-Resistant Soybean (*Glycine max*)," 2001, Weed Tech, 15:56-61.

Currie, Randall S. et al., "Effects of Herbicides and Application Timing on Woollyleaf Bursage (*Ambrosia grayi*)", Weed Technology, 2000, pp. 188-190, vol. 14, Issue 1.

De Barreda, D.G. et al., "Evaluation of Glyphosate for Weed Control in Citrus Orchards of Spain", Proceedings of the International Society of Citriculture, 1981, pp. 487-489, vol. 2, International Society of Citriculture, Tokyo, Japan.

Enloe, Stephen F. et al., "Use of Quinclorac Plus 2,4-D for Controlling Field Bindweed (*Convolvulus arvensis*) in Fallow", Weed Technology, 1999, pp. 731-736, vol. 13, Issue 4.

Faiz, M.A. Ahmad, "Effects of Herbicide Mixtures, Surfactants and Spray Volumes on the Control of *Imperata cylindrica* (L.) Raeuschel", Journal of Rubber Research, 1998, pp. 179-189, vol. 1, Issue 3.

Figueroa, P.F., "First-Year Results of a Herbicide Screening Trial in a Newly Established Red Alder Plantation with 1+0 Bare-Root and Plug Seedling Stock", Proc. of Western Soc. of Weed Sci., 1988, pp. 108-124, vol. 41.

Flint, J.L. et al., "Antagonism of Glyphosate Toxicity to Johnsongrass (*Sorghum halepense*) by 2,4-D and Dicamba", Weed Science, 1989, pp. 700-705, vol. 37, Issue 5.

Flint, J.L. et al., "Effects of Glyphosate Combinations with 2,4-D or Dicamba on Field Bindweed (*Convolvulus arvensis*)", Weed Science, 1989, pp. 12-18, vol. 37, Issue 1.

Foloni, L.L., "Evaluation of Pre-Plant and Pre- and Post-Emergence Herbicides for No-Till Cotton in Cerrados Areas", The 1997 Brighton Crop Protection Conference—Weeds, 1997, pp. 863-868.

Franz, J.E., et al., "Glyphosate: A Unique Global Herbicide, Chapter 7, Glyphosate Herbicide Compositions, Additives, and Mixtures" 1997, ACS Monograph 189, pp. 187-231.

Gigax, Danny R. et al., "Field Bindweed Control with Fall-Applied Glyphosate and 2,4-D", Proceedings—North Central Weed Control Conference, 1978, pp. 153-158, vol. 33.

Glenn, Scott et al., "Canada Thistle (*Cirsium arvense*) Control in No-Tillage Corn (*Zea mays*)", Weed Technology, 1994, pp. 134-138, vol. 8.

Heap, I.M., "Herbicide Resistance—Australia vs. the Rest of the World," Thirteenth Australian Weeds Conference, Sep. 8-13, 2002, Perth, Western Australia, pp. 645-649.

Hoagland, R.E., "Interaction of Indoleacetic Acid and Glyphosate on Phenolic Metabolism in Soybeans", Pesticide Biochemistry and Physiology, 1990, pp. 68-75, vol. 36.

Kashin, A.A. et al., "Herbicide containing amine salts of N-phosphonomethylglycine and 2,4-dichlorophenoxyacetic acid", Chemical Abstracts, 1996, p. 473, vol. 124, No. 19, 253337n, American Chemical Society.

Leys, A.R. et al., "Evaluation of herbicides for control of summer-growing weeds on fallows in south-eastern Australia", Australian Journal of Experimental Agriculture, 1990, pp. 271-279, vol. 30.

Lym, R.G. et al., "Effect of Glyphosate on Introduced and Native Grasses", Weed Technology, 1991, pp. 421-425, vol. 5, Issue 2.

Lym, R.G. et al., "Leafy Spurge (*Euphorbia esula*) Control, Forage Production, and Economic Return with Fall-Applied Herbicides", Weed Technology, 1994, pp. 824-829, vol. 8, Issue 4.

Miller, S.D., "Non-selective herbicides for weed control in fallow", Research Report—North Central Weed Control Conference, 1982, pp. 92 and 105, vol. 39, North Central Weed Control Conference, Champaign ,Illinois.

Milne, B., 1987 Results, Weed Research & Demonstration Unit, Orange, Department of Agriculture, Agricultural Research & Veterinary Center, New South Wales Government, 4 pages.

Milne, B., 1990 Results, Weed Research & Demonstration Unit, Orange, Department of Agriculture, Agricultural Research & Veterinary Center, New South Wales Government, 3 pages.

Milne, B., 1992 Results, Weed Research & Demonstration Unit, Orange, Department of Agriculture, Agricultural Research & Veterinary Center, New South Wales Government, 11 pages.

Moshier, L.J., "Response of Honeyvine Milkweed (*Ampelamus albidus*) to Herbicide Applications", Weed Science, 1980, pp. 722-724, vol. 28, Issue 6.

Moshier, Loren J. et al., "Honeyvine Milkweed (*Ampelamus Albidus*) Response to Foliar Herbicides", Weed Science, 1986, pp. 730-734, vol. 34, Issue 5.

O'Sullivan, P.A., et al., "Interaction Between Glyphosate and Various Herbicides for Broadleaved Weed Control," 1980, Weed Research, 20:255-260.

O'Sullivan, P.A., et al., "Influence of Picloram on *Cirsium Arvense* (L.) Scop. Control with Glyphosate," 1982, Weed Research, 22:251-256.

Ogg, Jr., A.G., et al., "Effects of Preplant Treatment Interval and Tillages on Herbicide Toxicity to Winter Wheat (*Triticum aestivum*)", Weed Technology, 1991, pp. 291-296, vol. 5, Issue 2.

Ramos, H.H., et al., "Efeitos da Qualidade da Água de Pulverização Sobre a Eficácia de Gerbicidas Aplicados em Pós-Emergência", Bragantia, Campinas, 1998, pp. 313-324, vol. 57, Issue 2.

Reynolds, D., et al., "Weed Science—Cutleaf Eveningprimrose Control with Preplant Burndown Herbicide Combinations in Cotton", The Journal of Cotton Science, 2000, pp. 124-128, vol. 4, Issue 2.

Sarpe, N. et al., "Development of Various Strategies to Control Both Annual and Perennial Weed Species in Apple Orchards on Sandy Soils", Brighton Crop Protection Conference—Weeds, 1995, pp. 947-952.

Schultz, M.E. et al., "Absorption, Translocation, and Metabolism of 2,4-D and Glyphosate in Hemp Dogbane (*Apocynum cannabinum*)," Weed Science, 1980, pp. 13-20, vol. 28, Issue 1, Weed Science Society of America, Champaign, Illinois.

Sharma, Shiv D. et al., "Surfactants Increase Toxicity of Glyphosate and 2,4-D to Brazil Pusley", HortScience, 2001, pp. 726-728, vol. 36, Issue 4, American Society for Horticultural Science, Mt. Vernon, Virginia.

Smeda, Reid J. et al., "Biology and control of burcucumber", Weed Science, 2001, pp. 99-105, vol. 49.

Sprague, Ellis B., "Suppression of Brambles in Mechanized Strip Cuttings in Northern Maine", Proc. Ann. Mtg. Northeastern Weed Sci. Soc., 1979, pp. 47-49.

Thomas, P.E.L., "Chemical control of some broadleaved weeds which grow during winter in untilled maize lands", South African Journal of Plant and Soil, 1986, pp. 185-188, vol. 3, Issue 4.

Vencill, William K. (editor), Herbicide Handbook, Weed Science Society of America, 8th ed. (2002) at pp. 111-115 (2,4-D), pp. 116-118 (2,4-DB), pp. 133-135 (dichlorprop), pp. 276-278 (MCPA), pp. 281-283 (mecoprop) and pp. 345-348 (picloram).

Westra, Philip et al., "Field Bindweed (*Convolvulus arvensis*) Control with Various Herbicide Combinations", Weed Technology, 1992, pp. 949-955, vol. 6, Issue 4.

Whaley et al., "Effect of Fall Herbicide Treatments and Stage of Horsenettle (*Solanum carolinense*) Senescence on Control", Weed Technology, Apr. 2002, vol. 16, No. 2, pp. 301-308.

Wicks, Gail A. et al., "Control of Triazine-Resistant Kochia (*Kochia scoparia*) in Sorghum (*Sorghum bicolor*)", Weed Technology, 1994, pp. 748-753, vol. 8, Issue 4.

Wicks, Gail A. et al., "Effect of Herbicides Applied in Winter Wheat (*Triticum aestivum*) Stubble on Weed Management in Corn (*Zea mays*)", Weed Technology, 2000, pp. 705-712, vol. 14, Issue 4.

Wicks, Gail A. et al., "Effect of Rainfall on Glyphosate Plus 2,4-D Performance on Echinochloa crus-galli", Weed Science, 1995, pp. 666-670, vol. 43, Issue 4.

Landmaster® BW, Specimen Label, 1994, Monsanto Company.

RT Master, Specimen Label, 2001, Monsanto Company.

Agrian, Buffer Protect, Westbridge Agricultural Products, http://www.agrian.com/labelcenter, downloaded Jan. 17, 2013, 2 pages.

Behrens, R., et al., "Dicamba Volatility," 1979, Weed Science, 27/5:486-493.

Branham, B.E., et al., "Drift and Volatility of Broadleaf Herbicides," 1987, pp. 126-129.

(56) References Cited

OTHER PUBLICATIONS

Clarity®, Safety Data Sheet, BASF, Revised Aug. 14, 2006, 7 pages.
Dion, H.M., et al., "Competitive Sorption Between Glyphoste and Inorganic Phosphate on Clay Minerals and Low Organic Matter Soils," 2001, J Radioanaly and Nucl Chem, 249/2:385-390.
Foy, C.L., et al., "Effect of Inhibitors and Herbicides on Tricarboxylic Acid Cycle Substrate Oxidation by Isolated Cucumber Mitochondria," 1965, Weeds, 13/3:226-231.
Hall, J.K., et al., "Dicamba Mobility in Conventionally Tilled and Non-Tilled Soils," 1994, Soil & Tillage Res, 30:3-17.
Hartzler, B., "Dicamba Volatility," 2001, Weed Science Online, Iowa State University, 4 pages.
Hoefer, R.H., et al., "Absorption of Dicamba in Soybeans as Effected by Formulation and Surfactants," 1979, North Central Weed Control Conference, Abstract, pp. 4-5.
LUPASOL®, Polyethylenimines for Creative Connections, BASF, 2005, 6 pages.
LUPASOL® Products, Technical Information, Feb. 2008, BASF, 12 pages.
Material Safety Data Sheet, BANVEL®, EPA Reg. No. 51036-289, BASF, Prepared Jul. 14, 1999, 3 pages.
Material Safety Data Sheet, BANVEL II®, BASF, Revised Nov. 30, 2006, 5 pages.
Material Safety Data Sheet, DICAMBA 480 Manufacturing Concentrate, Reg. No. 24774, Syngenta Crop Protection Canada, Inc., MSDS Preparation Date Dec. 31, 2008, 6 pages.
Material Safety Data Sheet, Blend of Di-potassium Phosphate, Nitrogen, and Ag-Phite (DKP xtra), Product No. 3-18-20, Plant Food Systems, Inc., Undated, 1 page.
Nalewaja, J.D., et al., "Salt Antagonism of Glyphosate," 1991, Weed Science, 39:622-628.
Ramirez-Ortega, R., et al., "Enhancement Effect of N, P and K on Glyphosate for Broomrape (*Orobanche crenata* Forsk.) Control in Faba Bean (*Vicia faba* L.)," 1992, FABIS Newsletter 31, pp. 37-39.
Owen, M.D.K., et al., "Evaluation of Nicosulfuron, Rimsulfuron, and Pyridate Applied Postemergence for Weed Control in Corn," 1995, NCWSS Research Report-V.52, Ames, IA, 149-152.
Peniuk, M.G., et al., "Absorption, Translocation, and Metabolism are Not the Basis for Differential Selectivity of Wild Mustard (*Sinapis arvensis* L.) to Auxinic Herbicides," 1992, WSSA Abstracts, No. 165, 32:55, 4 pages.
Petersen, P.J., et al., "Dicamba Absorption and Translocation as Influenced by Formulation and Surfactant," 1985, Weed Science, 33:717-720.
Poovaiah, B.W., et al., "Effects of Inorganic Salts on Tissue Permeability," 1976, Plant Physiol., 58:182-185.
Quimby, P.C., Jr., et al., "Selectivity of Dicamba in Wheat and Wild Buckwheat," 1971, Weed Science, 19/5:598-601.
Sargent, J.A., "Chapter 10 Relationship of Selectivity to Uptake and Movement," 1976, Herbicides, 2nd Ed, vol. 2, 303-312, 12.
Scott, P.C., "Separation of Effects of Auxin and Ethylene in Pea Roots," 1970, Nature, 226:1366-1367.
Sprankle, P., et al., "Rapid Inactivation of Glyphosate in the Soil," 1975, Weed Science, 23/3:224-228.
Wauchope, R.D., et al, "The SCS/ARS/CES Pesticide Properties Database for Environmental Decision-Making," 1992, Rvws of Environ Contam and Toxic, 123:1-164.
Climb®, Alkalinity Agent, Product Information, Wilbur Ellis, undated, 2 pages.
Nalewaja, J.D., et al., "2,4-D Amine Antagonism by Salts," 1991, Weed Technology, 5/4:873-880.
Cognis, "Functional Products AGNIQUE PG 8107-G," Sep. 3, 2009, 2 pages.
McCormack, M.L., et al., "Glyphosate and Triclopyr Mixtures to Control Forest Brush," 1981, Proceedings Northeastern Weed Science Society, Philadelphia, PA, 35:218, 2 pages.
McCormack, M.L., et al., "Timing Triclopyr and Glyphosate Treatments on Forest Brush," 1982, Proceedings Northeastern Weed Science Society, New York, NY, 36:209-214, 7 pages.

McDonald, P.M., et al., "Response of Young Ponderosa Pines, Shrubs, and Grasses to Two Release Treatments," 1996, USDA Forest Service Res. Note PSW-RN-419-Web, 8 pages.
Notice of Pesticide Registration, Roundup Pro Concentrate, EPA Ref. No. 524-529, issued on Oct. 5, 2000, 34 pages.
Obenshain, K.R., et al., "Spatial Analysis of Herbicide Decay Rates in Louisiana," 1997, Environmental Monitoring and Assessment, 48:307-316, 10 pages.
Pernak, et al., "Ionic Liquids with Herbicidal Anions," 2011, Tetrahedron, 67:4838-4844, 7 pages, XP028227648.
Pernak, et al., "2,4-D Based Herbicidal Ionic Liquids," 2012, Tetrahedron, 68:4267-4273, 6 pages, XP028479458.
Potts, K.T., Comprehensive Heterocyclic Chemistry, 1984, 5:284, 1 page.
Prigot et al., "Derivatives of Piperazine. XXII. Piperazinium Salts for Utilization in Identification of Organic Acids," 1948, J Am Chem Soc, 70:2758-2759, 2 pages, XP055056011.
Product Guide Book 2000, Dow AgroSciences, 43 pages.
Product Label, Garlon 4 Specialty Herbicide (DowElanco), Sep. 8, 1995, 15 pages.
Product Label, Garlon 3A (DowElanco), EPA Reg. No. 62719-37 (Amended Nov. 11, 1996), 15 pages.
Product Label, Invader 600 Herbicide (Nufarm), NRA Approval No. 49998/0900, (2000), 4 pages.
Product Label, Roundup Max, Group M Herbicide (Monsanto), (Date Unknown), 18 pages.
Product Label, Lontrel Herbicide (DowAgroSciences), NRA Label No. 31635/1102, Approved Nov. 14, 2002, 12 pages.
Product Label, Roundup CT Broadacre Herbicide (Monsanto), (Mar. 31, 2000), 7 pages.
Product Label, RT Master Herbicide (Monsanto Company), EPA Reg. No. 524-LGR, Accepted Jun. 29, 2001, 28 pages.
Product Label, Touchdown Hi Tech Herbicide (Syngenta Crop Protection), NRA Approval No. 54617/0502, 12 pages.
Product Label, Roundup CT Herbicide (Monsanto), NRA Approval No. 31394/1102, (Jun. 2002) 15 pages.
Product Label, Roundup PowerMax Herbicide (Monsanto), NRA Approval No. 55687/1202, (Nov. 2002 and Jan. 2, 2003), 13 pages.
Product Label and Material Safety Data Sheet for Eclipse® Glyphosate Tolerant Canola Herbicide Tank-Mix, Registration No. 26633 Pest Control Products Act, Label Code CN-26633/26634-002-E, Dow AgroSciences, 2002 and 2003, 12 pages.
"Registered Pesticides 1992-1994" prepared by Pesticides Board Malaysia, 3 pages.
Roundup CT Broadacre Herbicide, Public Chemical Registration Information System, http://services.apvma.gov.au/Pubcris WebClientldetails.do?view~summary&pcode~316, downloaded Jun. 20, 2013, 6 pages.
Safety Data Sheet—Clarity (Version 3.0), BASF The Chemical Company, May 2, 2013, 9 pages.
Seifert, J.R., et al., "Pre and Post Herbicide Applications on Hardwood Seedlings," 1992, Proceedings North Central Weed Science Society, Chicago, IL, 47:98, 3 pages.
SIGMA Product Information 1-Methylimidazole product No. M8878 [Online, retrieved on Nov. 8, 2017]. Retrieved from the Internet: <https://www.sigmaaldrich.com/content/dam/sigma-aldrich/docs/Sigma/Product_Information_sheet/1/m8878pis.pdf>, 1 page.
SIGMA-Aldrich Product Information Imidazole, for molecular biology Catalog No. I5513 [online, retrieved on Nov. 8, 2017]. Retrieved from the Internet: <https//www.sigmaaldrich.com/content/dam/sigma-aldrich/docs/Sigma/roduct_Information_Sheet/2/I15513pis.pdf>, 1 page.
Site Management and Productivity in Tropical Plantation Forests: A Progress Report (bears the date of Dec. 1999), 14 pages.
Sparacino, A.C., et al., "Le Controle Des Rubus spp. Presentes Sur Les Rives Des Canaux D'Irrigation et Des Rizieres," 1993, Proceedings 45th International Symposium on Crop Protection, Part III, University of Gent, MFLRA3 58(a), p. 1018-1025, 6 pages.
Statutory Declaration of Phillip Maxwell Hay, dated Jul. 13, 2012, filed in Opposition Proceeding in Australian Patent Application 2005221166, 91 pages.
Supplemental Labeling regarding Roundup Pro Herbicide by Monsanto, EPA Reg. No. 524-475 (Nov. 1995), 10 pages.

(56) References Cited

OTHER PUBLICATIONS

Table 4-10, Chapter 4, "Triclopyr", Herbicide Risk Assessment, Marin Municipal Water District, 2010, http://www.marinwater.org/documentcenter/view/254, p. 4-39, downloaded Oct. 13, 2015, XP04760094, 1 page.
The Herbicide Glyphosate, 1985, Grossbard and Atkinson, Eds., Butterworth & Co. (Publishers) Ltd., p. 223, 3 pages.
Theilig, G., et al., "Imidazolsynthesen mit Fomiamid (Formamid-Reaktionen, I. Mitteil.)," 1953, Chemische Berichte, 86:99-95, 9 pages, XP055056002.
Vermeulen, J.D., et al., A Guide to the Use of Herbicides, 1993, Dept of Agriculture, Republic of South Africa, 14th Ed., pp. 112-123, 15 pages.
Wagner, E., et al., "Coupling of Adenovirus to Transferrin-Polylysine/DNA Complexes Greatly Enhances Receptor-Mediated Gene Delivery and Expression of Transfected Genes," 1992, PNAS, 89/13:6099-6103, 5 pages.
Wait, J.D., et al., "Weed Control in Glyphosate Resistant Corn," 2002, North Central Weed Science Society Research Report, 59:133-134, 2 pages.
Wan, Y., et al., "Generation of Large Numbers of Independently Transformed Fertile Barley Plants," 1994, Plant Physiology, 104:37-48, 12 pages.
Wilkes, J.S., et al., Dialkylimidazolium Chloroaluminate Melts: A New Class of Room-Temperature Ionic Liquids for Electrochemistry, Spectroscopy, and Synthesis, 1982, Inorg. Chem., 21:1263-1264, 2 pages.
Wright, G.M., et al., "Understory Vegetation Control to Establish Oak Regeneration," 1983, North Central Weed Control Conference Proceedings, Columbus, Ohio, 38:139. 3 pages.
Yeiser, J.L., "June, July and August Applications of Glyphosate Tank Mixes for Site Preparation," 1991, Proceedings Southern Weed Science Society, San Antonio, TX, pp. 250-255, 8 pages.
Abdelghani, A.A., "Assessment of the Exposure of Workers Applying Herbicide Mixtures (2, 4-D+Roundup, Garlon-3A+Roundup), Toxicity and Fate of These Mixtures in the Environment," Summary Report, 1995, Conducted for Louisiana Department of Transportation and Development, Louisiana Transportation Research Center in Cooperation with U.S. Department of Transportation Federal Highway Administration, State Project #736-14-0067, No. 90-6ss, 70 pages.
Abdelghani, A.A., et al., "Toxicity Evaluation of Single and Chemical Mixtures of Roundup, Garlon-3A, 2,4-D, and Syndets Surfactant to Channel Catfish (*Ictalurus punctatus*), Bluegill Sunfish (*Lepomis microchirus*), and Crawfish (*Procambarus* spp.)," 1997, Evaluation of Single and Chemical Mixtures, J. Wiley & Sons, Inc., pp. 237-243, 7 pages.
Application for Amended Product Label, Banvel Herbicide (BASF Corporation), EPA Reg. No. 7969-131, Jul. 18, 2001, 19 pages.
Application for Amended Product Label, Clarity Herbicide (BASF Corporation), EPA Reg. No. 7969-137, Jul. 19, 2000, 20 pages.
Arif, A., et al., "Lalang Grass Control with Low Spray Volume of Glyphosate Herbicide," 1986, Symposium in Weed Science, Biotrop Special Publication No. 24, pp. 317-324.
Arsenovic, M., et al., "Weed Control on Railways in Yugoslavia," Brighton Crop Protection Conference-Weeds-1991, vol. 3, pp. 1159-1164.
Bower, R., et al., "Transgenic Sugarcane Plants via Microprojectile Bombardment," 1992, The Plant Journal, 2/3:409-416, 8 pages.
Bytebier, B., et al., "T-DNA Organization in Tumor Cultures and Transgenic Plants of the Monocotyledon Asparagus Officinalis," 1987, PNAS, USA, Genetics, 84:5345-5349, 5 pages.
Chambers, A., "Field Crop Herbicide Guide 1997-1998", Institute for Integrated Agricultural Development, RMB 1145, Rutherglen, 3685, Kondinin Group, Publisher, pp. 337-338, 4 pages.
Chee, Y.K., et al., "Sheep Grazing Reduces Chemical Weed Control in Rubber," 2002, Australian Centre for International Agriculture Research, Carberra, Australia, pp. 120-123, 4 pages.

Chorbadjian, R., et al., Interaction Between Glyphosate and Fluroxypyr Improve Mallow Control, 2002, Crop Protection, 21:689-692, 4 pages.
Christou, P., "Stable Transformation of Soybean Callus by DNA-Coated Gold Particles," 1988, Plant Physiol, 87:671-674, 4 pages.
Communication of Notice of Opposition, dated May 4, 2012, issued in European Patent Application No. 05725288.4, 18 pages.
Communication of Notices of Opposition, dated Jun. 4, 2012, issued in European Patent Application No. 05725288.4, 1 page.
Daggett, R.H., et al., "Long-Term Effects of Herbicide and Pre-Commercial Thinning on Young Spruce-Fir Stands: The Austin Pond Study," Silviculture Research, Cooperative Forestry Research Unit Annual Report 2001-2002, University of Maine, pp. 29-31, 3 pages.
Derivative, Merriam-Webster's Collegiate Dictionary, 1996, Tenth Edition, 3 pages.
D'sa, A., et al., "4,5-Dimethylimidazole: A Correction and Alternative Synthesis," 1991, J Heterocyclic Chem, 28, 1819-1920, 2 pages, XP055055998.
Duff, et al., "Identification of Carboxylic Acids: Use of N-Methylpiperazine and N-Phenylpiperazine," 1969, J Chem Ed, ACS, 46:388-390, 3 pages, XP009141119.
EPA Application for Pesticide, Accord Herbicide, ID No. 200405 (Sep. 1995), 32 pages.
Fraley, R.T., et al., "Expression of Bacterial Genes in Plant Cells," 1983, PNAS, 80:4803-4807, 5 pages.
Fromm, M.E., et al., "Expression of Genes Transferred into Monocot and Dicot Plant Cells by Electroporation," 1985, PNAS, 82/17:5824-5828, 5 pages.
Fynan, E.F., et al., DNA Vaccines: Protective Immunizations by Parenteral, Mucosal, and Gene-Gun Inoculations, 1993, PNAS, 90:11478-11482, 5 pages.
Giesemann, et al., "Untersuhungen über 1-Triphenylmethyl-imidazole, I," 1959, Chemische Berichte, 92:92-96, 7 pages, XP055056003.
Gilchrist, T.L., Heterocyclic Chemistry, Second Ed., 1992, Longman Group United Kingdom, pp. 283-293, 13 pages.
Gordon-Kamm, W.J., et al., "Transformation of Maize Cells and Regeneration of Fertile Transgenic Plants," 1990, The Plant Cell, 2:603-618, 17 pages.
Harahap, W., "The Study of Glyphosate and its Mixture in Controlling General Weeds in Rubber Planting Strips," Symposium in Weed Science, BIOTROP Spec. Publ. No. 24, 1986, pp. 349-357, 9 pages.
Hatzios, et al., "Pelargonic Acid," 1998, WAASA Herbicide Handbook, pp. 55-57, 3 pages, XP002953604.
Holt, H.A., et al., "Controlling Woody Plants with Wiping Application," 1986, Proceedings Southern Weed Science Society, Weed Science and Risk Assessment, 39th Annual Meeting, Nashville, TN, p. 364, 3 pages.
International Preliminary Report on Patentability issued in International PCT Application No. PCT/US2010/044873, dated Feb. 23, 2012, 16 pages.
International Preliminary Report on Patentability dated Apr. 29, 2014, in International PCT Application No. PCT/US2012/062059, 13 pages.
International Search Report and Written Opinion dated Jun. 14, 2013, in International PCT Application No. PCT/US2012/062059, 21 pages.
International Search Report and Written Opinion issued in International PCT Application No. PCT/US2010/044873, dated May 10, 2011, 22 pages.
International Search Report and Written Opinion issued in International PCT Application No. PCT/US2013/043995, dated Oct. 24, 2013, 9 pages.
International Search Report and Written Opinion issued in International PCT Application No. PCT/US2014/018829, dated Jun. 2, 2014, 10 pages.
International Search Report issued in International PCT Application PCT/US2004/012368, dated Aug. 24, 2004, 7 pages.
Jackson, N.E., "Control of Brush and Chaparral Species with Glyphosate," 1986, Proceedings 38th Annual California Weed Conference, Fresno, California, pp. 221-223, 4 pages.

(56) References Cited

OTHER PUBLICATIONS

Kay, S.H., et al., "Effects of Tank Mixing Triclopyr Amine and Glyphosate on Control of Alligatorweed," 1992, Proceedings Southern Weed Science Society, 45th Annual Meeting, Little Rock, Arkansas, p. 291, 2 pages.

Lawlor, F.M., et al., Response of Swallow-Wort to Herbicides (2001), Weed Science, 50/2, Abstract only, 1 page.

Lawrie, J., et al., Effects of Herbicide Mixtures and Additives on Rhododendron Ponticum, Weed Research, 1993, 33:25-34, 10 pages.

Little, K., et al., "Control of Eucalyptus Grandis Cut Stumps," 1998, ICFR Bulletin Series, No. 02/98, 16 pages.

Little, K., et al., "First Rotation Eucalyptus Macarthurii Cut Stump Control in KwaZulu-Natal, South Africa," Jul. 2006, South African Forestry Journal No. 207, pp. 15-20, 6 pages.

Little, K., et al., "The Killing of Eucalyptus Grandis Multiple-Stem Cut-Stumps in the Karkloof Project," ICFR Bulletin Series, No. 3/2000, 6 pages.

Lu, L., et al., "High Efficiency Retroviral Mediated Gene Transduction into Single Isolated Immature and Replatable CD343 + Hematopoietic Stem/Progenitor Cells from Human Umbilical Cord Blood," 1993, J Exp Med, 178/6:2089-2096, 8 pages.

Material Safety Data Sheet, "Concentrate Roundup PowerMAX Weedkiller," Scotts, (Apr. 15, 2004), 4 pages.

\* cited by examiner

AQUEOUS CONCENTRATED HERBICIDAL COMPOSITIONS CONTAINING GLYPHOSATE SALTS AND DICAMBA SALTS

REFERENCE TO RELATED APPLICATIONS

This application is the United States National Stage Application of International PCT Application No. PCT/US2013/043995, filed Jun. 4, 2013, and claims the benefit of U.S. Provisional Application Ser. No. 61/655,018, filed Jun. 4, 2012, the entire disclosures of which are incorporated herein by reference.

FIELD OF THE INVENTION

The present invention generally relates to herbicidal concentrate compositions containing a combination of herbicides. In particular, the present invention relates to aqueous herbicidal concentrate compositions containing glyphosate salt and dicamba salt herbicides.

BACKGROUND OF THE INVENTION

The present invention relates generally to herbicidal concentrate compositions, processes for preparing these concentrates, and methods of using such compositions to kill or control the growth and proliferation of unwanted plants. In particular, the present invention relates to herbicidal concentrate compositions which comprise a salt of N-(phosphonomethyl)glycine(glyphosate) and a salt of 3,6-dichloro-2-methoxy benzoic acid (also known as 3,6-dichloro-o-anisic acid and commonly referred to as dicamba).

Glyphosate is well known in the art as an effective post-emergent foliar-applied herbicide. In its acid form, glyphosate has the following structure:

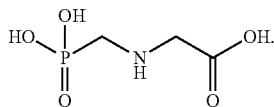

Glyphosate acid is relatively insoluble in water (1.16 wt. % at 25° C.). For this reason it is typically formulated as a water-soluble salt. For example, herbicidal concentrate compositions and application formulations containing the sodium, potassium, ammonium, isopropylamine, or monoethanolamine salts of glyphosate are well known in the art.

Herbicidal compositions and formulations comprising glyphosate or salts thereof are useful for suppressing the growth of, or killing, unwanted plants such as grasses, weeds and the like. Glyphosate is typically applied to the foliage of the target plant. After application, glyphosate is absorbed by the foliar tissue of the plant and translocated throughout the plant. Glyphosate noncompetitively blocks an important biochemical pathway which is common to virtually all plants, but which is absent in animals. Although glyphosate is very effective in killing or controlling the growth of unwanted plants, the uptake (i.e., absorption) of glyphosate by the plant foliar tissue and translocation of glyphosate throughout the plant is relatively slow. Visual symptoms that a plant has been treated with glyphosate may not appear until one week or more after treatment.

Dicamba has proven to be a particularly effective auxin herbicide. In its acid form, dicamba has the following structure:

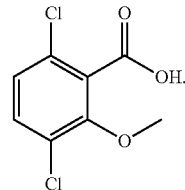

Like glyphosate, dicamba is typically formulated as a salt, such as a sodium, potassium, diethanolamine, isopropylamine, diglycolamine, or dimethylamine salt.

Generally, auxin herbicides such as dicamba mimic or act like natural auxin plant growth regulators. Auxin-like herbicides appear to affect cell wall plasticity and nucleic acid metabolism, which can lead to uncontrolled cell division and growth. The injury symptoms caused by auxin-like herbicides include epinastic bending and twisting of stems and petioles, leaf cupping and curling, and abnormal leaf shape and venation.

Off-site movement is commonly associated with dicamba and other auxin herbicides. Under certain conditions of application, dicamba can migrate from the application site to adjacent crop plants, such as soybeans and cotton, where contact damage to sensitive plants can occur. Various strategies have been suggested to reduce off-site movement of dicamba including formulating dicamba in the form of certain mineral or amine salts, encapsulating dicamba with a polymeric coating, and complexing with a polybasic polymer.

With the development of transgenic plants including stacked glyphosate-tolerant and dicamba-tolerant traits, herbicidal compositions containing a combination of glyphosate and dicamba are particularly beneficial and convenient for control of unwanted plants. There is a need for highly concentrated herbicidal compositions containing glyphosate and dicamba that can be economically produced while having sufficient stability and that can be diluted to provide effective spray formulation solutions for application to unwanted plants.

As will be clear from the disclosure that follows, these and other benefits are provided by the present invention.

SUMMARY OF THE INVENTION

In general, the present invention is directed to herbicidal concentrate compositions containing a combination of glyphosate salt and dicamba salt. In various embodiments, the concentrate compositions are low volatility aqueous herbicidal concentrate compositions including a glyphosate component comprising a glyphosate salt (e.g., monoethanolamine salt of glyphosate), a dicamba component comprising a dicamba salt (e.g., diglycolamine salt of dicamba), and a surfactant. In these embodiments, (i) the compositions contain a total active herbicide loading of glyphosate salt and dicamba salt of at least about 450 grams acid equivalent per liter; (ii) the pH of the concentrate composition is less than about 5.7; and (iii) the acid equivalent weight ratio of glyphosate salt to dicamba salt is from about 1:1 to about 3:1.

Other objects and features will be in part apparent and in part pointed out hereinafter.

DESCRIPTION OF THE PREFERRED EMBODIMENTS

The present invention is directed to aqueous herbicidal concentrate compositions comprising glyphosate salt and dicamba salt herbicides.

One aspect of the present invention is to provide a highly concentrated herbicidal composition containing glyphosate salt and dicamba salt that can be diluted to provide an effective spray formulation solution. A highly concentrated composition reduces the volume of the liquid and associated packaging that would otherwise be required for more dilute compositions. The smaller volume reduces space required to store and transport the concentrate composition prior to sale or use. Further, a highly concentrated herbicidal composition containing both glyphosate salt and dicamba salt is convenient for agricultural workers that formulate spray solutions and avoids the risk of tank mixing errors.

Another aspect of the present invention is to provide a stable and compatible highly concentrated herbicidal composition containing both glyphosate salt and dicamba salt that is relatively clear and does not appreciably separate into phases or form precipitates upon standing or storage. A stable and compatible highly concentrated herbicidal composition beneficially provides a uniform spray formulation solution upon dilution without the need for excessive agitation.

Another aspect of the present invention is to provide a highly concentrated herbicidal composition containing glyphosate salt, dicamba salt, and at least one surfactant. Incorporation of at least one surfactant beneficially increases the effectiveness of the glyphosate and dicamba active ingredients upon application to the foliar tissues of undesired plants.

Yet another aspect of the present invention is to provide a highly concentrated herbicidal composition containing glyphosate salt and dicamba salt that is economical to produce.

In accordance with the present invention, the aqueous herbicidal concentrate composition comprises a glyphosate component comprising one or more water-soluble salts of glyphosate. Glyphosate salts known in the art include mono, di- or tribasic and include ammonium (e.g., mono-, di- or triammonium), alkali metal (e.g., potassium or sodium), sulfonium (e.g., mono-, di- or trimethylsulfonium) and organic ammonium salts of N-(phosphonomethyl)glycine. The organic ammonium salts, commonly referred to as amine salts, can comprise aliphatic or aromatic amine salts and can include primary, secondary, tertiary or quaternary amine salts. Representative examples of such organic amine salts include isopropylamine, n-propylamine, ethylamine, dimethylamine, monoethanolamine, ethylenediamine and hexamethylenediamine salts of N-(phosphonomethyl)glycine. The monoethanolamine salt and potassium salt of glyphosate have been found to be particularly suitable for achieving high herbicidal loadings in the concentrate compositions of the present invention that further include a dicamba salt. Therefore, in various embodiments, the glyphosate component of the aqueous herbicidal concentrate composition of the present invention comprises a glyphosate salt selected from the group consisting of the monoethanolamine salt, potassium salt, and mixtures thereof. In certain embodiments, the aqueous herbicidal concentrate contains glyphosate in the form of the monoethanolamine salt. In other embodiments, the aqueous herbicidal concentrate composition contains glyphosate in the form of the potassium salt. In some embodiments, the aqueous herbicidal concentrate composition contains glyphosate in the form of the isopropylamine salt.

In accordance with the present invention, the aqueous herbicidal concentrate composition further comprises a dicamba component comprising one or more salts of dicamba. Dicamba salts known in the art include, for example, the sodium, potassium, monoethanolamine, diethanolamine, isopropylamine, diglycolamine and dimethylamine salts. Accordingly, in various embodiments, the dicamba component of the aqueous herbicidal concentrate composition comprises a dicamba salt selected from the group consisting of the sodium, potassium, monoethanolamine, diethanolamine, isopropylamine, diglycolamine and dimethylamine salts. In these and other embodiments, the aqueous herbicidal concentrate composition comprises a dicamba salt selected from the group consisting of the monoethanolamine salt, diglycolamine salt, potassium salt, and mixtures thereof. In certain embodiments, the aqueous herbicidal concentrate composition contains the monoethanolamine salt of dicamba. In other embodiments, the aqueous herbicidal concentrate composition contains the diglycolamine salt of dicamba.

Other salts of dicamba for use in the practice of the present invention include polyamine salts such as those described in International Patent Application Publication WO 2011/039172, which is incorporated herein by reference for all relevant purposes. The salts described in WO 2011/03917 include an anionic pesticide, such as dicamba, and a cationic polyamine of formula (A)

(A)

wherein $R^1$, $R^2$, $R^4$, $R^6$ and $R^7$ are independently H or $C_1$-$C_6$-alkyl, which is optionally substituted with OH, $R^3$ and $R^5$ are independently $C_2$-$C_4$-alkylene, X is OH or $NR^6R^7$, and n is from 1 to 20; or a cationic polyamine of formula (B)

(B)

wherein $R^{10}$ and $R^{11}$ are independently H or $C_1$-$C_6$-alkyl, $R^{12}$ is $C_1$-$C_{12}$-alkylene, and $R^{13}$ is an aliphatic $C_5$-$C_8$ ring system, which comprises either nitrogen in the ring or which is substituted with at least one unit $NR^{10}R^{11}$. Examples of these cationic polyamines include tetraethylenepentamine, triethylenetetramine, diethylenetriamine, pentamethyldiethylenetriamine, N,N,N',N'',N''-pentamethyl-dipropylenetriamine, N,N-bis(3-dimethylaminopropyl)-N-isopropanolamine, N'-(3-(dimethylamino)propyl)-N,N-dimethyl-1,3-propanediamine, N,N-bis(3-aminopropyl)methylamine, N-(3-dimethylaminopropyl)-N,N-diisopropanolamine, N,N,N'-trimethylaminoethyl-ethanolamine, aminopropylmonomethylethanolamine, and aminoethylethanolamine. Accordingly, in various embodiments, the aqueous herbicidal concentrate composition comprises a dicamba salt comprising a cationic polyamine of formula A or B above.

The aqueous herbicidal concentrate composition may contain various combinations of glyphosate and dicamba salts. However, in accordance with some embodiments, certain combinations of glyphosate and dicamba salts are selected in order to achieve highly concentrated and stable herbicidal compositions and provide other advantages as described herein. In various embodiments, the aqueous herbicidal concentrate composition comprises glyphosate in the form of the monoethanolamine salt and a dicamba salt selected from the group consisting of the diglycolamine salt, monoethanolamine salt, potassium salt and mixtures thereof. In these and other embodiments, the aqueous herbicidal concentrate composition comprises the monoethanolamine salt of glyphosate and the diglycolamine salt of dicamba. In still other embodiments, the aqueous herbicidal concentrate composition contains glyphosate in the form of the potassium salt and a dicamba salt selected from the group consisting of the diglycolamine salt, monoethanolamine salt, potassium salt and mixtures thereof. In certain embodiments, the counter-ion of the glyphosate salt component and the dicamba salt component of the herbicidal concentrate composition are the same. For example, the herbicidal concentrate composition can include glyphosate and dicamba both in the form of the monoethanolamine or potassium salt of the herbicidal active ingredients.

Generally, the aqueous herbicidal concentrate compositions of the present invention include glyphosate and dicamba in relatively equal proportions or an excess of glyphosate on an acid equivalent (a.e.) basis. As used herein, the term "acid equivalent" or "a.e." refers to the amount of herbicide present without taking into account the weight of the counter-ion of the salt species present. In various embodiments, the acid equivalent weight ratio of glyphosate salt to dicamba salt ranges from about 1:1 to about 5:1, from about 1:1 to about 3:1, from about 1.5:1 to about 3:1, from about 1.5:1 to about 2.5:1, or from about 1.5:1 to about 2:1. In certain embodiments, the acid equivalent weight ratio of glyphosate salt to dicamba salt is about 1.5:1, about 2:1, or about 3:1. It has been discovered that the ability to incorporate a surfactant into a stable glyphosate and dicamba herbicidal concentrate (i.e., without precipitation or phase separation) is influenced by the ratio of glyphosate to dicamba present in the herbicidal concentrate composition. More particularly, surfactant compatibility in the herbicidal concentrate composition improves as the acid equivalent weight ratio of glyphosate salt to dicamba salt decreases.

Within these relative proportions of glyphosate and dicamba salts, the aqueous herbicidal concentrate compositions of the present invention provide a high total active herbicide loading of glyphosate salt and dicamba salt. Typically, the total active herbicide loading of glyphosate salt and dicamba salt is at least about 360 g/l, at least about 380 g/l, at least about 400 g/l, at least about 410 g/l, at least about 420 g/l, at least about 430 g/l, at least about 440 g/l, at least about 450 g/l, at least about 460 g/l, at least about 470 g/l, at least about 480 g/l, at least about 490 g/l, at least about 500 g/l, at least about 510 g/l, at least about 520 g/l, or at least about 530 g/l on an acid equivalent basis. In various embodiments, the total active herbicide loading of glyphosate salt and dicamba salt is from about 360 g/l to about 550 g/l, from about 380 g/l to about 540 g/l, from about 400 g/l to about 540 g/l, from about 410 g/l to about 540 g/l, from about 420 g/l to about 540 g/l, from about 430 g/l to about 540 g/l, from about from about 440 g/l to about 540 g/l, from about 450 g/l to about 540 g/l, from about 460 g/l to about 540 g/l, from about 470 g/l to about 540 g/l, from about 480 g/l to about 540 g/l, from about 480 g/l to about 530 g/l, or from about 480 g/l to about 520 g/l on an acid equivalent basis. In these and other embodiments, the aqueous herbicidal concentrate compositions contain a total active herbicide loading of glyphosate salt and dicamba salt of about 480 g/l, about 500 g/l, about 520 g/l, or about 530 g/l on an acid equivalent basis.

The pH of the aqueous herbicidal concentrate composition is an important aspect of the present invention. The pH of the herbicidal concentrate composition has an effect on the compatibility between glyphosate and dicamba herbicide salt components and the total herbicide loading that can be achieved, the ability to incorporate a surfactant into a stable concentrate composition as well as the volatility of the dicamba component of the composition. Increasing the pH of the concentrate composition often allows a higher concentration of surfactant to be incorporated and also generally reduces volatility of the dicamba herbicide component. However, increasing the pH requires greater expenditure of base used to neutralize the herbicidal active ingredients. Moreover, the effect of pH on compatibility between the glyphosate and dicamba salts and total herbicide loading is dependent upon the particular salt of glyphosate employed and is not always consistent over the entire pH range. For example, it has been discovered that the monoethanolamine salt of glyphosate exhibits a high degree of compatibility with dicamba salts. However, the compatibility of the isopropylamine salt of glyphosate with dicamba salts and the total herbicide loading that can be achieved tends to decrease as the pH increases, while the compatibility of the potassium salt of glyphosate with dicamba salts generally increases as the pH increases, at least over some interval of the pH range typically employed.

Despite these various and sometimes countervailing considerations with respect to pH, it has been discovered that a stable, compatible herbicidal concentrate of glyphosate and dicamba salts can be advantageously prepared at a relatively acidic pH thereby minimizing the cost associated with neutralization of the herbicidal active ingredients, while nevertheless maintaining dicamba volatility at acceptable levels and permitting the formulation of herbicidal concentrate compositions containing appreciable concentrations of useful surfactants.

Typically, the pH of the concentrate compositions is less than about 5.7, less than about 5.6, less than about 5.5, less than about 5.4, less than about 5.3, less than about 5.2, less than about 5.1, less than about 5, less than about 4.9, or less than about 4.8. In various embodiments, the pH of the concentrate compositions is from about 4.5 to about 5.7, from about 4.8 to about 5.7, from about 5 to about 5.7, from about 4.5 to about 5.6, from about 4.8 to about 5.6, from about 5 to about 5.6, from about 4.5 to about 5.5, from about 4.8 to about 5.5, from about 5 to about 5.5, from about 4.5 to about 5.4, from about 4.8 to about 5.4, or from about 5 to about 5.4. The pH of the herbicidal concentrate compositions is measured using conventional pH measuring equipment (e.g., by immersing the probe of a pH meter into the concentrate). A suitable pH measurement protocol is described in Example 6.

The aqueous herbicidal concentrate compositions of the present invention typically include a surfactant to enhance the herbicidal effectiveness of the glyphosate and dicamba salts in spray formulations prepared by dilution of the concentrate for application to unwanted plants. As noted above, it is believed the ratio of glyphosate to dicamba affects the degree to which one or more surfactants may be incorporated into the aqueous herbicidal concentrate composition. When dicamba salt is present in higher concentrations (e.g., from about 1:1 to about 3:1 glyphosate to dicamba acid equivalent weight ratio), it has been observed that a wider range of surfactants can be incorporated into the aqueous herbicidal concentrate composition without precipitation or phase separation as compared to compositions having a lower concentration of dicamba salt (e.g., 5:1 glyphosate to dicamba acid equivalent weight ratio). Accordingly, in certain embodiments, the acid equivalent weight ratio of glyphosate salt to dicamba salt is from about 1:1 to about 3:1, from about 1.5:1 to about 3:1, from about 1.5:1 to about 2.5:1, from about 1:1 to about 2:1, from about 1.5:1 to about 2:1, or from about 1.7:1 to about 2:1.

It has been discovered that some surfactants conventionally used in the art in combination with glyphosate and/or dicamba herbicides are difficult to successfully incorporate into a stable concentrate composition, even at lower acid equivalent weight ratios of glyphosate salt to dicamba salt. Nevertheless, applicants have identified several classes of surfactants and surfactant combinations that provide stable aqueous herbicidal concentrate compositions for use in conjunction with the present invention.

In one embodiment, the surfactant comprises a quaternary ammonium salt having the structure of formula (I):

(I)

wherein $R^{11}$ is hydrocarbyl or substituted hydrocarbyl having from 1 to about 30 carbon atoms; $R^{12}$ in each of the $(R^{12}O)_x$ and $(R^{12}O)_y$ groups is independently $C_2$-$C_4$ alkylene; $R^{13}$ is hydrogen, or a linear or branched alkyl group having from 1 to about 4 carbon atoms; $R^{14}$ is hydrocarbyl or substituted hydrocarbyl having from 1 to about 30 carbon atoms; x and y are independently an average number from 1 to about 40; and $X^-$ is an agriculturally acceptable anion. In this context, preferred $R^{11}$ and $R^{14}$ hydrocarbyl groups are linear or branched alkyl, linear or branched alkenyl, linear or branched alkynyl, aryl, or aralkyl groups. Preferably, $R^{11}$ and $R^{14}$ are independently a linear or branched alkyl or linear or branched alkenyl group having from 1 to about 25 carbon atoms; $R^{12}$ in each of the $(R^{12}O)_x$ and $(R^{12}O)_y$ groups is independently $C_2$-$C_4$ alkylene; $R^{13}$ is hydrogen, methyl or ethyl; and the sum of x and y is an average number from about 2 to about 30. More preferably, $R^{11}$ and $R^{14}$ are independently a linear or branched alkyl group having from 1 to about 22 carbon atoms; $R^{12}$ in each of the $(R^{12}O)_x$ and $(R^{12}O)_y$ groups is independently ethylene or propylene; $R^{13}$ is hydrogen or methyl; and the sum of x and y is an average number from about 2 to about 20. Even more preferably, $R^{11}$ is a linear or branched alkyl group having from about 8 to about 22 carbon atoms; $R^{14}$ is a linear or branched alkyl group having from 1 to about 22 carbon atoms; $R^{12}$ in each of the $(R^{12}O)_x$ and $(R^{12}O)_y$ groups is independently ethylene or propylene; $R^{13}$ is hydrogen or methyl; and x is an average number from about 2 to about 20. Most preferably, $R^{11}$ is a linear or branched alkyl group having from about 8 to about 22 carbon atoms; $R^{14}$ is a linear or branched alkyl group having from 1 to about 6 carbon atoms; $R^{12}$ in each of the $(R^{12}O)_x$ and $(R^{12}O)_y$ groups is independently ethylene or propylene; $R^{13}$ is hydrogen or methyl; and x is an average number from about 2 to about 15; or $R^{11}$ and $R^{14}$ are independently a linear or branched alkyl group having from about 8 to about 22 carbon atoms; $R^{12}$ in each of the $(R^{12}O)_x$ and $(R^{12}O)_y$ groups is independently ethylene or propylene; $R^{13}$ is hydrogen or methyl; and x is an average number from about 5 to about 15.

One example of a preferred dialkoxylated quaternary ammonium surfactants is ETHOQUAD C-12 (a cocoalkylmethylbis(2-hydroxyethyl)ammonium chloride surfactant available from Akzo Nobel). In various embodiments, the surfactant or surfactant system may include a solvent or other additives. For example, when ETHOQUAD C-12 is incorporated into the aqueous herbicidal concentrate composition, it may be added as a mixture containing diethylene glycol (DEG) or polyethylene glycol (PEG). Therefore, in certain embodiments, the surfactant comprises ETHOQUAD C-12 dissolved in diethylene glycol or polyethylene glycol (e.g., a mixture containing 75 wt. % ETHOQUAD C-12 and 25 wt. % diethylene glycol or polyethylene glycol). Other examples of preferred quaternary ammonium surfactants that can be used to form stable aqueous glyphosate and dicamba salt concentrate compositions are ARQUAD T27W and ARQUAD C33W, which are available from Akzo Nobel.

In another embodiment, the surfactant comprises an alkoxylated tertiary etheramine having the structure of formula

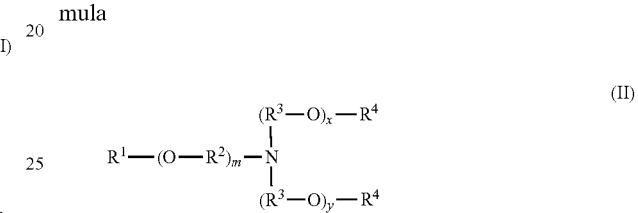

(II)

wherein $R^1$ is a hydrocarbyl or substituted hydrocarbyl having from about 4 to about 22 carbon atoms; $R^2$ and $R^3$ are each independently a hydrocarbylene having 2, 3, or 4 carbon atoms; each $R^4$ is independently hydrogen or $C_{1-6}$ alkyl, m is an average number from about 1 to about 10; and the sum of x and y is an average value ranging from about 2 to about 60. $R^1$ is preferably an alkyl having an average value ranging from about 4 to about 22 carbon atoms, more preferably from about 8 to about 22 carbon atoms, and still more preferably from about 10 to about 20 carbons atoms, for example coco, tallow, oleyl, and stearyl. Sources of the $R^1$ group include, for example, coco or tallow, or $R_1$ may be derived from synthetic hydrocarbyls, such as decyl, dodedecyl, tridecyl, tetradecyl, hexadecyl, or octadecyl groups. The number m is preferably from about 1 to 5, such as 2 to 3. $R^2$ and $R^3$ are preferably independently ethylene, propylene, isopropylene, and are preferably ethylene. $R^4$ is preferably hydrogen. The sum of x and y is preferably an average value ranging from about 2 to about 25.

One preferred example of an alkoxylated tertiary etheramine surfactant is SURFONIC AGM 550 available from Huntsman Petrochemical Corporation wherein $R^1$ is $C_{12-14}$, $R^2$ is isopropyl, $R^3$ is ethylene, $R^4$ is hydrogen, m is 2 and the sum of x and y is 5. Other examples of preferred alkoxylated tertiary etheramine surfactants that can be used to form stable aqueous glyphosate and dicamba salt concentrate compositions are ETHOMEEN C-15, ETHOMEEN C-12, and AROMOX C12W, all available from Akzo Nobel.

In order to sufficiently compatibilize and increase the amount of an alkoxylated tertiary etheramine surfactant or quaternary ammonium salt surfactant incorporated into the aqueous herbicidal concentrate compositions of the present invention, it may be useful to utilize a surfactant system comprising the combination of an alkoxylated tertiary etheramine surfactant or quaternary ammonium salt surfactant as described above with a non-ionic alkylpolysaccharide (e.g., alkylpolyglucoside or APG) surfactant. Alkylpolysaccharide surfactants are generally reported to be less effective in enhancing herbicidal activity as compared to cationic or amphoteric surfactants when used as the sole surfactant component of solution concentrate formulations of a glyphosate salt. Advantageously, however, it has been discovered that the inclusion of an alkylpolysaccharide surfactant allows a higher concentration of an alkoxylated tertiary etheramine surfactant or quaternary ammonium salt surfactant to be incorporated into the aqueous herbicidal concentrate composition to take advantage of its improved efficacy in enhancing the herbicidal effectiveness of the glyphosate and dicamba salts.

Suitable alkylpolysaccharide surfactants have the structure of formula (III):

wherein $R^5$ is a straight or branched chain substituted or unsubstituted hydrocarbyl selected from alkyl, alkenyl, alkylphenyl, alkenylphenyl having from about 4 to about 22 carbon atoms. The sug moiety is a saccharide residue, and may be an open or cyclic (i.e., pyranose) structure. The saccharide may be a monosaccharide having 5 or 6 carbon atoms, a disaccharide, an oligosaccharide or a polysaccharide. Examples of suitable saccharide moieties, including their corresponding pyranose form, include ribose, xylose, arabinose, glucose, galactose, mannose, telose, gulose, allose, altrose, idose, lyxose, ribulose, sorbose (sorbitan), fructose, and mixtures thereof. Examples of suitable disaccharides include maltose, lactose and sucrose. Disaccharides, oligosaccharides and polysaccharides can be a combination of two or more identical saccharides, for example maltose (two glucoses) or two or more different saccharides, for example sucrose (a combination of glucose and fructose). The degree of polymerization, u, is an average number from 1 to about 10, from 1 to about 8, from 1 to about 5, from 1 to about 3, and from 1 to about 2. As known to those skilled in the art, as depicted in formula (III), $R^5$ is linked to an oxygen atom of the sug moiety. In various particular embodiments, the alkylpolysaccharide surfactant may be an alkylpolyglucoside (APG) surfactant of formula (III) wherein: $R^5$ is a branched or straight chain alkyl group preferably having from 4 to 22 carbon atoms, more preferably from 8 to 18 carbon atoms, or a mixture of alkyl groups having an average value within the given range; sug is a glucose residue (e.g., a glucoside); and u is from 1 to about 5, and more preferably from 1 to about 3. In various embodiments, the surfactant comprises an APG of formula (III) wherein $R^5$ is a branched or straight chain alkyl group having from 8 to 10 carbon atoms or a mixture of alkyl groups having an average value within the given range and u is from 1 to about 3.

Examples of surfactants of formula (III) are known in the art. For example, one preferred surfactant is AGNIQUE PG8107-G (AGRIMUL PG 2067) available from BASF.

Representative alkylpolysaccharide surfactants are presented in the table below wherein for each surfactant sug in formula (III) is a glucose residue.

| Trade name | $R^5$ | u |
|---|---|---|
| APG 225 | $C_{8-12}$ alkyl | 1.7 |
| APG 325 | $C_{9-11}$ alkyl | 1.5 |
| APG 425 | $C_{8-16}$ alkyl | 1.6 |
| APG 625 | $C_{12-16}$ alkyl | 1.6 |
| GLUCOPON 600 | $C_{12-16}$ alkyl | 1.4 |
| PLANTAREN 600 | $C_{12-14}$ alkyl | 1.3 |
| PLANTAREN 1200 | $C_{12-16}$ alkyl | 1.4 |
| PLANTAREN 1300 | $C_{12-16}$ alkyl | 1.6 |
| PLANTAREN 2000 | $C_{8-16}$ alkyl | 1.4 |

-continued

| Trade name | $R^5$ | u |
|---|---|---|
| AGRIMUL PG 2076 | $C_{8-10}$ alkyl | 1.5 |
| AGRIMUL PG 2067 | $C_{8-10}$ alkyl | 1.7 |
| AGRIMUL PG 2072 | $C_{8-16}$ alkyl | 1.6 |
| AGRIMUL PG 2069 | $C_{9-11}$ alkyl | 1.6 |
| AGRIMUL PG 2062 | $C_{12-16}$ alkyl | 1.4 |
| AGRIMUL PG 2065 | $C_{12-16}$ alkyl | 1.6 |
| BEROL AG 6202 | 2-ethyl-1-hexyl | |

In various embodiments, the aqueous herbicidal concentrate composition contains at least about 1 wt. %, at least about 2 wt. %, at least about 3 wt. %, at least about 4 wt. %, or at least about 5 wt. % of surfactant. In these and other embodiments, the aqueous herbicidal concentrate composition contains from about 1 wt. % to about 20 wt. %, from about 2.5 wt. % to about 20 wt. %, from about 5 wt. % to about 20 wt. %, from about 2.5 wt. % to about 15 wt. %, from about 2.5 wt. % to about 10 wt. %, from about 5 wt. % to about 15 wt. %, or from about 5 wt. % to about 15 wt. % of surfactant.

In some embodiments, the aqueous herbicidal concentrate composition contains at least about 5 wt. % of a quaternary ammonium salt surfactant of formula (I) as described above. In other embodiments, the aqueous herbicidal concentrate composition contains a surfactant system comprising from about 5 wt. % to about 7.5 wt. % of an alkylpolyglucoside surfactant of formula (III) and at least about 2.5 wt. % of an alkoxylated tertiary etheramine surfactant of formula (II) as described above.

The aqueous herbicidal concentrate composition of the present invention may be prepared by a process that includes adding a dicamba salt or solution thereof to an aqueous solution concentrate comprising the glyphosate salt. In various embodiments, the glyphosate salt solution concentrate contains glyphosate that is neutralized using a molar excess of base to fully neutralize the acidic site of glyphosate having the lowest pKa, but less than two molar equivalents of base to glyphosate (e.g., prepared using 1.3 molar equivalents of base to neutralize 1.3 acidic sites of glyphosate). Accordingly, in various embodiments glyphosate salt solution concentrates may be prepared using molar equivalents of neutralizing base to glyphosate from about 1:1 to about 1.5:1, from about 1.1:1 to about 1.5:1, from about 1.2:1 to about 1.5:1, from about 1.25:1 to about 1.5:1, from about 1:1 to about 1.4:1, from about 1.2:1 to about 1.4:1, from about 1.25:1 to about 1.4:1, or from about 1.25:1 to about 1.35:1. The glyphosate salt concentrate can be prepared by adding additional neutralizing base corresponding to the relevant glyphosate salt to an existing aqueous glyphosate salt solution concentrate. Additional water may be added as necessary in order to maintain the glyphosate salt in solution. Alternatively, the glyphosate salt concentrates can be prepared by adding the neutralizing base directly to glyphosate acid wetcake and then dissolving the mixture of wetcake and base in water.

Off-site movement is a known problem of spray formulations containing salts of dicamba. Under certain conditions of application, dicamba can migrate from the application site to adjacent crop plants. As noted above, as pH increases, the volatility of dicamba generally decreases. In accordance with the present invention, it has been discovered that significant decreases in dicamba volatility are realized when the pH of the aqueous herbicidal glyphosate and dicamba salt concentrate composition is controlled as described above. Additional base can be added as necessary to the glyphosate salt solution concentrate and/or aqueous herbicidal glyphosate and dicamba salt concentrate composition as necessary to adjust the pH within the desired range as disclosed herein. Adjusting the pH within the disclosed ranges typically provides greater than about a 40%, 50%, 60% or even 75% reduction in volatility when compared to a conventional tank mixes of potassium or monoethanolamine glyphosate with diglycolamine salt of dicamba (e.g., a tank mix of CLARITY available from BASF and ROUNDUP WEATHERMAX available from Monsanto).

One or more surfactants or surfactants or surfactant systems as described above may be introduced at any step of the preparation process. In various embodiments, the surfactant is added once the dicamba and glyphosate salts have been combined in the concentrate solution. In other embodiments, the surfactant can be added to the dicamba salt solution before adding to the aqueous glyphosate salt solution concentrate.

The aqueous herbicidal concentrate compositions containing glyphosate salt and dicamba salt of the present invention are typically formulated to exhibit good storage stability at relatively low temperatures, relatively high temperatures, and/or over a wide temperatures range such that the compositions remain relatively clear without precipitation or phase separation after prolonged storage. In various embodiments, the concentrate compositions exhibit good storage stability at a temperature of less than about 0° C., less than about −10° C., less than about −20° C., or less than about −20° C. Additionally or alternatively, the concentrate compositions exhibit good storage stability at a temperature of at least about 25° C., at least about 40° C., at least about 55° C., or at least about 60° C. In various embodiments, the concentrate compositions exhibit good storage stability from about −30° C. to about 80° C., from about −30° C. to about 70° C., from about −30° C. to about 60° C., from about −10° C. to about 90° C., from about −10° C. to about 70° C., from about −10° C. to about 60° C., from about 0° C. to about 90° C., from about 0° C. to about 70° C., or from about 0° C. to about 60° C. In these embodiments, the concentrate compositions exhibit good storage stability over the period of at least about one week, at least about two weeks, at least about three weeks, or at least about four weeks.

The herbicidal concentrate compositions may further comprise other conventional adjuvants, excipients or additives known to those skilled in the art. These other additives or ingredients may be introduced into the compositions of the present invention to provide or improve certain desired properties or characteristics of the formulated product. Hence, the herbicidal concentrate composition may further comprise one or more additional ingredients selected from, without limitation, foam-moderating agents, preservatives or anti-microbials, antifreeze agents, solubility-enhancing agents, dyes, and thickening agents. For example, in various embodiments the aqueous herbicidal concentrate composition includes a foam-moderating agent such as SAG 1572 (a silicone antifoam emulsion available from Momentive). Typically the concentration of foam-moderating agent in the aqueous herbicidal concentrate composition is less than about 0.1 wt. % or less than about 0.05 wt. % (e.g., about 0.01 wt. %)

The aqueous herbicidal glyphosate and dicamba concentrate composition may be diluted with water and applied to the foliage of unwanted plants as a spray formulation solution by methods known in the art. In accordance with the methods of using a formulation of the present invention, an application mixture comprising a dilution of the aqueous herbicidal concentrate composition may be prepared, which typically comprises from about 0.1 to about 50 g a.e./L herbicide active. The application mixture is then applied to the foliage of a plant or plants at an application rate sufficient to give a commercially acceptable rate of weed control. Depending on plant species and growing conditions, the period of time required to achieve a commercially acceptable rate of weed control can be as short as a week or as long as three weeks, four weeks or 30 days. The application rate is usually expressed as amount of herbicide per unit area treated, e.g., grams acid equivalent per hectare (g a.e./ha) and can readily be determined by those skilled in the art.

The application mixture comprising a dilution of the aqueous herbicidal concentrate composition of the present invention can be applied pre-planting of the crop plant, such as from about 2 to about 3 weeks before planting glyphosate and dicamba-susceptible crop plants or crop plants not having a dicamba-resistant trait. Crop plants that are not susceptible to glyphosate and dicamba herbicides, such as corn, or plants having glyphosate-tolerant and dicamba-tolerant traits typically have no pre-planting restriction and the application mixture can be applied immediately before planting such crops.

The application mixture comprising a dilution of the aqueous herbicidal glyphosate and dicamba salt concentrate composition of the present invention can be applied at planting or post-emergence to crop plants having glyphosate-tolerant and dicamba-tolerant traits to control glyphosate and/or dicamba-susceptible weeds in a field of the crop plants and/or adjacent to a field of the crop plants.

EXAMPLES

The following non-limiting examples are provided to further illustrate the present invention.

Example 1

Various aqueous herbicidal concentrate compositions containing glyphosate salt and dicamba salt were prepared by adding the desired base (e.g., monoethanolamine (MEA), isopropylamine (IPA) or potassium hydroxide) to stock glyphosate salt solutions. Salt solutions of dicamba (e.g., diglycolamine (DGA), MEA, and K salts) were added to the glyphosate salt solutions to the desired acid equivalent weight ratio (e.g., glyphosate to dicamba weight ratios of 3:1, 2:1, or 1.5:1).

The solutions which provided stable, compatible herbicidal concentrate compositions upon mixing are listed below in Table 1.

TABLE 1

| Glyphosate salt | Dicamba salt | Weight ratio a.e. (Glyphosate/Dicamba) | Total herbicide loading (g/l a.e.) |
|---|---|---|---|
| MEA | DGA | 3:1 | 480 |
| MEA | MEA | 3:1 | 480 |
| MEA | K | 3:1 | 480 |
| IPA | DGA | 3:1 | 360 |
| IPA | MEA | 3:1 | 360 |
| IPA | K | 3:1 | 360 |
| K | DGA | 3:1 | 220 |
| K | MEA | 3:1 | 80 |
| K | K | 3:1 | 80 |
| MEA | DGA | 2:1 | 480 |
| MEA | MEA | 2:1 | 480 |
| MEA | K | 2:1 | 480 |
| IPA | DGA | 2:1 | 330 |

TABLE 1-continued

| Glyphosate salt | Dicamba salt | Weight ratio a.e. (Glyphosate/ Dicamba) | Total herbicide loading (g/l a.e.) |
|---|---|---|---|
| IPA | MEA | 2:1 | 330 |
| K | DGA | 2:1 | 330 |
| K | MEA | 2:1 | 330 |
| MEA | DGA | 1.5:1 | 480 |
| MEA | MEA | 1.5:1 | 480 |
| MEA | K | 1.5:1 | 480 |

Example 2

To evaluate whether surfactant(s) could be effectively incorporated into the aqueous herbicidal concentrate compositions of the present invention, several concentrate solutions containing MEA glyphosate and DGA dicamba and having a total herbicidal loading of approximately 480 g/l a.e. were prepared as described in Example 1, except various surfactants were combined the solution concentrates. The stability of the solutions was observed upon mixing and any precipitation or phase separation was noted. The stability of the solutions that appeared relatively homogeneous upon mixing was tested further by storing them at room temperature for 24 hours. Any precipitation or phase separate was noted after the 24 hour time period. Table 2 presents the results of these experiments.

TABLE 2

Surfactants combined with concentrates containing approx. 480 g/l a.e. of MEA glyphosate salt and DGA dicamba salt.

| Weight ratio a.e. (Glyphosate/ Dicamba) | Surfactant (wt. % in solution) | Cloud point | Stable concentrate after 24 hours? (Yes/No) |
|---|---|---|---|
| 3:1 | 5 wt. % APG & 2.5 wt. % AGM 550 | — | No |
| 3:1 | 7.5 wt. % APG & 2.5 wt. % AGM 550 | — | No |
| 2:1 | 5 wt. % Ethoquad C-12 | — | No |
| 2:1 | 5 wt. % APG & 2.5 wt. % AGM 550 | >90° C. | Yes |
| 1.5:1 | 5 wt. % Ethomeen C-12 | — | No |
| 1.5:1 | 5 wt. % Ethoquad C-12 | >90° C. | Yes |
| 1.5:1 | 5 wt. % Ethomeen SV-12 | 52° C. | No |
| 1.5:1 | 5 wt.% Ethomeen T-12 | 70° C. | No |
| 1.5:1 | 5 wt. % APG & 2.5 wt. % AGM 550 | >90° C. | Yes |

The results show that stable, clear herbicidal concentrates containing surfactant Ethoquad C-12 or surfactant system APG and AGM 550 were successfully prepared. The other surfactants tested resulted in concentrates that were either hazy in appearance or separated into phases on standing.

Example 3

To evaluate whether higher concentrations of surfactant(s) could be effectively incorporated into the aqueous herbicidal concentrate compositions of the present invention, concentrate solutions containing a 1.5:1 weight ratio of MEA glyphosate and DGA dicamba and having a total herbicidal loading of approximately 480 g/l a.e. were prepared in accordance with Example 1. Ethoquad C-12 dissolved in propylene glycol or diethylene glycol was then combined with the concentrates. The stability of the solutions was observed and any precipitation or phase separation was noted. Table 3 presents the results of these experiments.

TABLE 3

| Ethoquad C-12 (wt. % in solution) | Solvent | Cloud point | Stable concentrate formed? (Yes/No) |
|---|---|---|---|
| 7.5 | Diethylene Glycol | >90° C. | Yes |
| 10 | Diethylene Glycol | 85° C. | Yes |
| 7.5 | Propylene Glycol | >90° C. | Yes |
| 10 | Propylene Glycol | — | No |

The results show that stable, clear herbicidal concentrates containing surfactant 10 wt. % Ethoquad C-12 dissolved in diethylene glycol were successfully prepared. The concentrate containing 10 wt. % Ethoquad C-12 dissolved in propylene glycol separated on standing.

Other surfactants were also tested with this concentrate solutions containing a 1.5:1 weight ratio of MEA glyphosate and DGA dicamba and having a total herbicidal loading of 480 g/l a.e., including Armeen APA 810, Ammonyx 810-DO, Surfonics L12-8, L14-4 and L24-5, Tergitol 15-S-7 and Tomadol 1-3. However, concentrates containing these surfactants were either hazy in appearance or separated into phases on standing.

Example 4

To test the storage stability of the concentrate compositions, samples of selected concentrate compositions containing approximately 480 g/l a.e. of MEA glyphosate salt and DGA dicamba salt prepared in accordance with Example 2 were subjected to prolonged storage for four weeks at various storage temperatures. Table 4 shows that the selected concentrate compositions exhibited good storage stability, remaining relatively clear without precipitation or phase separation, after four weeks at the temperatures indicated below.

TABLE 4

| Weight ratio a.e. (Glyphosate/ Dicamba) | Surfactant (wt. % in solution) | −30° C. | −20° C. | −10° C. | 0° C. | 25° C. | 40° C. | 55° C. | 60° C. |
|---|---|---|---|---|---|---|---|---|---|
| 1.5:1 | None | S | S | S | S | S | S | S | S |
| 2:1 | None | S | S | S | S | S | S | S | S |

TABLE 4-continued

| Weight ratio a.e. (Glyphosate/ Dicamba) | Surfactant (wt. % in solution) | −30° C. | −20° C. | −10° C. | 0° C. | 25° C. | 40° C. | 55° C. | 60° C. |
|---|---|---|---|---|---|---|---|---|---|
| 3:1 | None | S | S | S | S | S | S | S | S |
| 1.5:1 | 5 wt. % Ethoquad C-12 | S | S | S | S | S | S | S | S |
| 1.5:1 | 5 wt. % APG & 2.5 wt. % AGM 550 | S | S | S | S | S | S | S | S |
| 2:1 | 5 wt. % APG & 2.5 wt. % AGM 550 | S | S | S | S | S | S | S | S |
| 3:1 | 7.5 wt. % APG & 2.5 wt. % AGM 550 | S | S | S | S | S | S | S | S |

S: donates that concentrate composition was "stable"

Example 5

This example describes experiments conducted to measure the dicamba concentration in the gas phase (air) volatilized from 2 wt. % a.e. dicamba spray solutions prepared from concentrates containing MEA glyphosate and DGA dicamba and having a total herbicidal loading of 480 g/l a.e. prepared in accordance with Example 1 and prior art tank mix spray solutions containing 2 wt. % a.e. DGA dicamba (CLARITY) plus 6 wt. % a.e. potassium glyphosate (WEATHERMAX) or MEA glyphosate.

10 mL samples of each solution were placed into a 50 mL plastic centrifuge tube with one hole approximately ⅛ in diameter drilled into the tube at the mark between 20 mL and 30 mL lines. A 22 mm×30 mm Polyurethane Foam (PUF), cut from a 76 mm length, available from SKC Inc., catalog # P22692, was placed into a glass tube of approximately 20 mm diameter with parafilm wrapped around the outside to obtain a snug fit into the top of the centrifuge tube. A hose was connected to the other end of the glass tube leading to a vacuum line. The air flow was regulated to approximately 2 L/min using a flow controller. Air was pulled through the tube at approximately 2 L/min for 24 hours. Note that the air conditions of flow rate, temperature, pressure and composition (e.g., relative humidity) are not narrowly critical as long as the various samples are analyzed under similar conditions. For instance, air at from about 5° C. to about 40° C., from about 0.5 to about 1.5 bar pressure, from about 0% to about 95% relative humidity, and at a flow rate of from about 0.1 to 10 L/min-mL sample could be suitably used for volatility analysis. The PUF was removed from the glass tube, extracted with 20 mL methanol and the resulting solution analyzed for dicamba concentration by LC-MS. The results are presented in Table 5.

As shown on Table 5, the spray solutions prepared from concentrates having a 2:1 or 1.5:1 weight ratio of glyphosate to dicamba exhibited lower dicamba volatility when compared to prior art spray solutions of CLARITY plus WEATHERMAX and CLARITY plus MEA glyphosate.

Example 6

Five glyphosate/dicamba premix concentrate formulations were prepared using five different MEA glyphosate salt solution concentrates. The MEA glyphosate salt solution concentrates employed were prepared using different molar ratios of MEA:glyphosate. The molar ratios that were used were 1.2:1, 1.25:1, 1.3:1, 1.35:1, and 1.4:1 MEA:glyphosate. To form the glyphosate/dicamba premix concentrate formulations, MEA glyphosate salt concentrate, CLARITY (DGA dicamba salt concentrate) and water were combined in a beaker. AGNIQUE PG8107 (a $C_{8-10}$ alkyl polyglycoside surfactant available from COGNIS) and AGM 550 (a $C_{12-14}$ alkoxylated tertiary available from Huntsman) were added followed by ferric citrate and SAG 1572 (a silicone antifoam emulsion available from Momentive). The ingredients were stirred together for 30 minutes. The list of ingredients for the glyphosate/dicamba premix concentrate formulations is set forth below in Table 6.

The following observations/tests were performed on the glyphosate/dicamba premix concentrate formulations: appearance, specific gravity, cloud point, temperature stability at 55° C. and −20° C. and pH, and are reported below in Tables 7 and 8.

TABLE 5

| Formulation | Dicamba, ng/L | Std dev |
|---|---|---|
| CLARITY + MEA glyphosate | 1.89 | 0.49 |
| CLARITY + WEATHERMAX | 1.63 | 0.48 |
| 3:1 MEAgly:DGAdc | 1.97 | 0.11 |
| 2:1 MEAgly:DGAdc | 1.15 | 0.12 |
| 1.5:1 MEAgly:DGAdc | 0.97 | 0.15 |

TABLE 6

List of ingredients and amounts

| Ingredient | Amount |
|---|---|
| CLARITY | 12.75% a.e. |
| MEA glyphosate | 25.5% a.e. |
| AGNIQUE PG 8107 | 5% w/w |
| SURFONIC AGM 550 | 2.5% w/w |
| Ferric citrate | 220 ppm Fe |
| SAG 1572 | 100 ppm |

TABLE 7

Summary of observations and measurements performed on the formulations

| Formulation | MEA: glyphosate acid molar ratio | Appearance | Specific gravity | Cloud Point |
|---|---|---|---|---|
| 8-1 | 1.2:1 | Cloudy, 2 layers on standing | Not measured | Not measured |
| 8-2 | 1.25:1 | Dark green, clear/hazy liquid | 1.2599 | >90° C. |
| 8-3 | 1.3:1 | Dark green, clear liquid | 1.2598 | >90° C. |
| 8-4 | 1.35:1 | Dark green, clear liquid | 1.2612 | >90° C. |
| 8-5 | 1.4:1 | Dark green, clear liquid | 1.2637 | >90° C. |

For the formulation prepared using the 1.2:1 MEA:glyphosate concentrate, when MEA glyphosate salt concentrate, CLARITY, and water were mixed, a clear green liquid formed. The salts themselves were compatible at that pH. Upon addition of the surfactants, the liquid turned hazy and 2 layers formed on standing. The formulation prepared using the 1.25 MEA:glyphosate concentrate was slightly hazy, but cleared on heating when the cloud point was measured. For the temperature stability study all of the formulation samples at −20° C. were viscous liquids. The formulation samples at 55° C. were all clear liquids. In the formulation sample prepared using the 1.25 MEA:glyphosate concentrate, there were slight wisps, probably surfactant, that were observed.

The pH of each premix concentrate formulation was measured. The pH measurements were made using a Mettler Toledo model SevenEasy pH meter with a Thermo Scientific ROSS Sure-flow pH probe. The pH meter was calibrated in accordance with the manufacturer's recommended protocol at pH 4 and pH 7 using standard buffer solutions (available from BDH). The pH measurements were obtained by immersing the probe of calibrated pH meter into each concentrate formulation and recording the digital reading.

Some samples of concentrate may exhibit sample matrix effects which have a negative interaction with pH electrodes. To determine if a sample causes an interaction, a calibration should be performed prior to sample analysis. During sample analysis, the response time to obtain a stable pH reading should be observed. Then, the response time and pH reading of the two buffers used for calibration should be rechecked. If the pH reading of the calibration buffers has a significant difference and the electrode response is slow (e.g., >20 seconds), a negative interaction of the pH electrode and sample is occurring. Different electrode should be tested until sample matrix effects are not observed.

To avoid clogging of the electrode junction, the electrode should be flushed with deionized water after each sample analysis.

Table 8 shows the pH measurements for each premix formulation tested.

TABLE 8

| Formulation | (MEA:glyphosate acid molar ratio) | pH measured |
|---|---|---|
| 8-2 | 1.25:1 | 5.01 |
| 8-3 | 1.3:1 | 5.11 |
| 8-4 | 1.35:1 | 5.25 |
| 8-5 | 1.4:1 | 5.37 |

Example 7

Selected premix concentrate formulations prepared in accordance with Example 6 were tested for dicamba volatility using the humidome method as described below. The formulations were compared to BANVEL (dimethylamine dicamba salt solution)+ROUNDUP WEATHERMAX, CLARITY+ROUNDUP WEATHERMAX, and CLARITY alone.

Humidomes were obtained from Hummert International (Part Nos 14-3850-2 for humidomes and 11-3050-1 for 1020 flat tray) and modified by cutting a 2.2 cm diameter hole on one end approximately 5 cm from the top to allow for insertion of a glass air sampling tube (22 mm OD) containing a polyurethane foam (PUF) filter. The sampling tube was secured with a VITON o-ring on each side of the humidome wall. The air sampling tube external to the humidome was fitted with tubing that was connected to a vacuum manifold immediately prior to sampling.

The flat tray beneath the humidome was filled 1 liter of sifted dry or wet 50/50 soil (50% Redi-Earth and 50% US 10 Field Soil) to a depth of about 1 cm. The flat tray bottom containing the dicamba formulation on soil was covered with a humidome lid and the lid was secured with clamps. The assembled humidomes were placed in a temperature and humidity controlled environment and connected to a vacuum manifold through the air sampling line. Air was drawn through the humidome and PUF at a rate of 2 liters per minutes (LPM) for 24 hours at which point the air sampling was stopped. The humidomes were then removed from the controlled environment and the PUF filter was removed. The PUF filter was extracted with 20 mL of methanol and the solution was analyzed for dicamba concentration using LC-MS methods known in the art.

To measure the dicamba concentration in the gas phase (air) volatilized from the spray solutions, solutions were prepared to contain 1.2% a.e. dicamba which is equivalent to an application rate of 1.0 lb/A a.e. at 10 GPA. Where glyphosate was added or was part of the formulation, the solution was sprayed at 2.4% a.e. or 2.0 lb/A a.e. The growth chambers were set at 35° C. and 40% RH. For each formulation four separate humidome boxes were sprayed to have 4 replicates measurements for each formulation. Table 9 also provides the mean concentration of dicamba in air for each formulation.

TABLE 9

| Formulation | Dicamba, ng/L | Std dev | Std error |
|---|---|---|---|
| BANVEL + WEATHERMAX | 5.26 | 0.94 | 0.33 |
| CLARITY + WEATHERMAX | 2.39 | 0.50 | 0.19 |
| 8-2 | 1.38 | 0.28 | 0.14 |
| 8-3 | 1.01 | 0.31 | 0.15 |
| 8-4 | 0.70 | 0.12 | 0.04 |
| 8-5 | 0.48 | 0.06 | 0.03 |
| CLARITY | 0.13 | 0.01 | 0.00 |

The results show that the spray solutions prepared from premix concentrate formulations 8-2, 8-3, 8-4, and 8-5 exhibited significantly lower dicamba volatility when compared to prior art spray solutions of BANVEL plus WEATHERMAX and CLARITY plus WEATHERMAX.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above compositions and processes without departing from the scope of the invention, it is intended that all matter contained in the above description shall be interpreted as illustrative and not in a limiting sense.

What is claimed is:

1. An aqueous herbicidal concentrate composition comprising:

(a) a glyphosate component comprising the monoethanolamine salt of glyphosate;

(b) a dicamba component comprising the diglycolamine salt of dicamba; and (c) a surfactant system, wherein (i) the composition contains a total active herbicide loading of glyphosate monoethanolamine salt and dicamba diglycolamine salt of at least about 360 grams acid equivalent per liter; (ii) the pH of the concentrate composition is from 4.8 to 5.7; and (iii) the acid equivalent weight ratio of glyphosate monoethanolamine salt to dicamba diglycolamine salt is from about 1:1 to about 3:1; and wherein the surfactant system comprises an alkoxylated tertiary etheramine having the structure of formula (II):

(II)

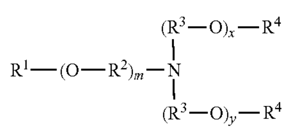

wherein $R^1$ is a hydrocarbyl or substituted hydrocarbyl having from about 4 to about 22 carbon atoms; $R^2$ and $R^3$ are each independently a hydrocarbylene having 2, 3, or 4 carbon atoms; each $R^4$ is independently hydrogen or $C_{1-6}$ alkyl, m is an average number from about 1 to about 10; and the sum of x and y is an average value ranging from about 2 to about 60; and an alkylpolysaccharide surfactant having the structure of formula (III):

$R^5$—O-$(sug)_u$ (III)

wherein $R^5$ is a straight or branched chain substituted or unsubstituted hydrocarbyl selected from alkyl, alkenyl, alkylphenyl, alkenylphenyl having from about 4 to about 22 carbon atoms; the sug moiety is a saccharide residue; and u is an average number from 1 to about 10.

2. The composition of claim 1 wherein the pH of the concentrate composition is from 4.8 to 5.6.

3. The composition of claim 1 wherein the pH of the concentrate composition is from about 5 to 5.5.

4. The composition of claim 1 wherein $R^1$ is an alkyl having an average value ranging from about 4 to about 22 carbon atoms; $R^2$ and $R^3$ are independently ethylene, propylene, isopropylene; $R^4$ is hydrogen; m is an average value ranging from about 1 to 5; and the sum of x and y is an average value ranging from about 2 to about 25.

5. The composition of claim 1 wherein $R^1$ is $C_{12-14}$; $R^2$ is isopropyl; $R^3$ is ethylene; $R^4$ is hydrogen; m is 2; and the sum of x and y is 5.

6. The composition of claim 5 wherein the surfactant system constitutes from about 2.5 wt. % to about 10 wt. % of the composition.

7. The composition of claim 1 wherein the alkylpolysaccharide surfactant is an alkylpolyglucoside wherein $R^5$ is a branched or straight chain alkyl group having from 4 to 22 carbon atoms or a mixture of alkyl groups having an average value within the given range; sug is a glucose residue; and u is from 1 to about 5.

8. The composition of claim 1 wherein the surfactant system constitutes from about 2.5 wt. % to about 15 wt. % of the concentrate composition.

9. The composition of claim 1 wherein the pH of the concentrate composition is from 5 to 5.7.

10. The composition of claim 1 wherein the surfactant system constitutes from about 2.5 wt. % to about 10 wt. % of the composition.

11. The composition of claim 1 wherein the total active herbicide loading of glyphosate monoethanolamine salt and dicamba diglycolamine salt is at least about 450 grams acid equivalent per liter.

12. The composition of claim 1 wherein the total active herbicide loading of glyphosate monoethanolamine salt and dicamba diglycolamine salt is from about 360 g/l to about 550 g/l on an acid equivalent basis.

13. The composition of claim 1 wherein the total active herbicide loading of glyphosate monoethanolamine salt and dicamba diglycolamine salt is from about 480 g/l to about 540 g/l on an acid equivalent basis.

14. The composition of claim 1 wherein the total active herbicide loading of glyphosate monoethanolamine salt and dicamba diglycolamine salt is from about 480 g/l to about 520 g/l on an acid equivalent basis.

15. The composition of claim 1 wherein the composition does not include a polybasic polymer.

16. An aqueous herbicidal concentrate composition comprising:

(a) a glyphosate component comprising the monoethanolamine salt of glyphosate;

(b) a dicamba component comprising the diglycolamine salt of dicamba; and (c) a surfactant system comprising an alkoxylated tertiary etheramine surfactant and an alkylpolyglucoside surfactant, wherein (i) the composition contains a total active herbicide loading of glyphosate monoethanolamine salt and dicamba diglycolamine salt of at least about 360 grams acid equivalent per liter; (ii) the pH of the concentrate composition is from 4.8 to 5.7; (iii) the acid equivalent weight ratio of glyphosate monoethanolamine salt to dicamba diglycolamine salt is from about 1:1 to about 3:1, (iv) the composition contains at least about 2.5 wt. % of the alkoxylated tertiary etheramine surfactant, and (v) the composition contains a total surfactant concentration that is from about 2.5 wt. % to about 10 wt. %.

17. The composition of claim 16 wherein the alkoxylated tertiary etheramine has the structure of formula (II):

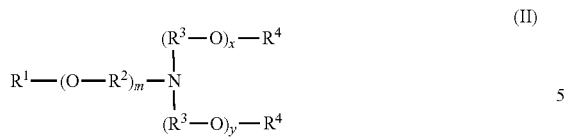

wherein $R^1$ is a hydrocarbyl or substituted hydrocarbyl having from about 4 to about 22 carbon atoms; $R^2$ and $R^3$ are each independently a hydrocarbylene having 2, 3, or 4 carbon atoms; each $R^4$ is independently hydrogen or $C_{1-6}$ alkyl, m is an average number from about 1 to about 10; and the sum of x and y is an average value ranging from about 2 to about 60.

18. The composition of claim 16 wherein the alkylpolysaccharide surfactant has the structure of formula (III):

wherein $R^5$ is a straight or branched chain substituted or unsubstituted hydrocarbyl selected from alkyl, alkenyl, alkylphenyl, alkenylphenyl having from about 4 to about 22 carbon atoms; the sug moiety is a saccharide residue; and u is an average number from 1 to about 10.

19. The composition of claim 16 wherein the composition does not include a polybasic polymer.

* * * * *